(12) United States Patent
Adiletta et al.

(10) Patent No.: US 10,674,238 B2
(45) Date of Patent: Jun. 2, 2020

(54) THERMALLY EFFICIENT COMPUTE RESOURCE APPARATUSES AND METHODS

(71) Applicant: INTEL CORPORATION, Santa Clara, CA (US)

(72) Inventors: Matthew J. Adiletta, Bolton, MA (US); Aaron Gorius, Upton, MA (US); Myles Wilde, Charlestown, MA (US); Michael T. Crocker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/423,467

(22) Filed: Feb. 2, 2017

(65) Prior Publication Data

US 2018/0027682 A1  Jan. 25, 2018

Related U.S. Application Data

(60) Provisional application No. 62/427,268, filed on Nov. 29, 2016, provisional application No. 62/376,859,
(Continued)

(51) Int. Cl.
*H05K 1/02* (2006.01)
*G06F 1/20* (2006.01)
(Continued)

(52) U.S. Cl.
CPC ...... *H04Q 11/0005* (2013.01); *B25J 15/0014* (2013.01); *B65G 1/0492* (2013.01); *G02B 6/3882* (2013.01); *G02B 6/3893* (2013.01); *G02B 6/3897* (2013.01); *G02B 6/4292* (2013.01); *G02B 6/4452* (2013.01); *G05D 23/1921* (2013.01); *G05D 23/2039* (2013.01);
(Continued)

(58) Field of Classification Search
CPC . H01L 23/34; H01L 23/36; G06F 1/20; G06F 1/183; G06F 3/0683; G06F 3/0688; G06F 1/206; H05K 7/20736; H05K 1/0203; H05K 2201/066; H05K 7/2039; H05K 7/20836; H05K 7/20772; H04Q 1/04
See application file for complete search history.

(56) References Cited

U.S. PATENT DOCUMENTS 8,755,192 B1 * 6/2014 Schrempp ................ G06F 1/20
                                                361/679.5
9,351,428 B2 * 5/2016 Eckberg ............. H05K 7/20772
(Continued)

FOREIGN PATENT DOCUMENTS

JP        H08148870 A        6/1996

OTHER PUBLICATIONS

International Search Report received for PCT Patent Application No. PCT/US2017/038644, dated Oct. 18, 2017, 3 pages.

*Primary Examiner* — James Wu
(74) *Attorney, Agent, or Firm* — Barnes & Thornburg LLP

(57) ABSTRACT

Examples may include racks for a data center and sleds for the racks, the sleds arranged to house physical resources for the data center. The sleds can house physical resources and heat sinks thermally coupled to the physical resources. The physical resources are arranged on the sleds and the heat sinks are configured so as to limit thermal shadowing between physical resources to reduce interference with airflow provided by fans of the racks.

12 Claims, 17 Drawing Sheets

Related U.S. Application Data filed on Aug. 18, 2016, provisional application No. 62/365,969, filed on Jul. 22, 2016.

(51) Int. Cl.

| | | |
|---|---|---|
| H04Q 11/00 | (2006.01) | |
| H03M 7/30 | (2006.01) | |
| H03M 7/40 | (2006.01) | |
| G06F 16/901 | (2019.01) | |
| G06F 3/06 | (2006.01) | |
| H04L 12/811 | (2013.01) | |
| G11C 7/10 | (2006.01) | |
| H05K 7/14 | (2006.01) | |
| G06F 1/18 | (2006.01) | |
| G06F 13/40 | (2006.01) | |
| H05K 5/02 | (2006.01) | |
| G08C 17/02 | (2006.01) | |
| H04L 12/24 | (2006.01) | |
| H04L 29/08 | (2006.01) | |
| H04L 12/26 | (2006.01) | |
| H04L 12/851 | (2013.01) | |
| G06F 9/50 | (2006.01) | |
| H04L 12/911 | (2013.01) | |
| G06F 12/109 | (2016.01) | |
| H04L 29/06 | (2006.01) | |
| G11C 14/00 | (2006.01) | |
| G11C 5/02 | (2006.01) | |
| G11C 11/56 | (2006.01) | |
| G02B 6/44 | (2006.01) | |
| G06F 8/65 | (2018.01) | |
| G06F 12/14 | (2006.01) | |
| G06F 13/16 | (2006.01) | |
| H04B 10/25 | (2013.01) | |
| G06F 9/4401 | (2018.01) | |
| G02B 6/38 | (2006.01) | |
| G02B 6/42 | (2006.01) | |
| B25J 15/00 | (2006.01) | |
| B65G 1/04 | (2006.01) | |
| H05K 7/20 | (2006.01) | |
| H04L 12/931 | (2013.01) | |
| H04L 12/939 | (2013.01) | |
| H04W 4/02 | (2018.01) | |
| H04L 12/751 | (2013.01) | |
| G06F 13/42 | (2006.01) | |
| H05K 1/18 | (2006.01) | |
| G05D 23/19 | (2006.01) | |
| G05D 23/20 | (2006.01) | |
| H04L 12/927 | (2013.01) | |
| H04L 12/781 | (2013.01) | |
| H04Q 1/04 | (2006.01) | |
| G06F 12/0893 | (2016.01) | |
| H05K 13/04 | (2006.01) | |
| G11C 5/06 | (2006.01) | |
| G06F 11/14 | (2006.01) | |
| G06F 11/34 | (2006.01) | |
| G06F 12/0862 | (2016.01) | |
| G06F 15/80 | (2006.01) | |
| H04L 12/919 | (2013.01) | |
| G06F 12/10 | (2016.01) | |
| G06Q 10/06 | (2012.01) | |
| G07C 5/00 | (2006.01) | |
| H04L 12/28 | (2006.01) | |
| H04L 29/12 | (2006.01) | |
| H04L 9/06 | (2006.01) | |
| H04L 9/14 | (2006.01) | |
| H04L 9/32 | (2006.01) | |
| H04L 12/933 | (2013.01) | |
| H04L 12/947 | (2013.01) | |
| G06F 9/30 | (2018.01) | |
| G06F 9/38 | (2018.01) | |
| G06F 9/54 | (2006.01) | |
| H04W 4/80 | (2018.01) | |
| G06Q 10/08 | (2012.01) | |
| G06Q 10/00 | (2012.01) | |
| G06Q 50/04 | (2012.01) | |

(52) U.S. Cl.
CPC ............... *G06F 1/183* (2013.01); *G06F 1/20* (2013.01); *G06F 3/061* (2013.01); *G06F 3/064* (2013.01); *G06F 3/067* (2013.01); *G06F 3/0611* (2013.01); *G06F 3/0613* (2013.01); *G06F 3/0616* (2013.01); *G06F 3/0619* (2013.01); *G06F 3/0625* (2013.01); *G06F 3/0631* (2013.01); *G06F 3/0638* (2013.01); *G06F 3/0647* (2013.01); *G06F 3/0653* (2013.01); *G06F 3/0655* (2013.01); *G06F 3/0658* (2013.01); *G06F 3/0659* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/30036* (2013.01); *G06F 9/3887* (2013.01); *G06F 9/4401* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 9/544* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 12/109* (2013.01); *G06F 12/1408* (2013.01); *G06F 13/161* (2013.01); *G06F 13/1668* (2013.01); *G06F 13/1694* (2013.01); *G06F 13/409* (2013.01); *G06F 13/4022* (2013.01); *G06F 13/4068* (2013.01); *G06F 13/42* (2013.01); *G06F 13/4282* (2013.01); *G06F 15/8061* (2013.01); *G06F 16/9014* (2019.01); *G06Q 10/06* (2013.01); *G06Q 10/06314* (2013.01); *G07C 5/008* (2013.01); *G08C 17/02* (2013.01); *G11C 5/02* (2013.01); *G11C 5/06* (2013.01); *G11C 7/1072* (2013.01); *G11C 11/56* (2013.01); *G11C 14/0009* (2013.01); *H03M 7/30* (2013.01); *H03M 7/3084* (2013.01); *H03M 7/3086* (2013.01); *H03M 7/40* (2013.01); *H03M 7/4031* (2013.01); *H03M 7/4056* (2013.01); *H03M 7/4081* (2013.01); *H03M 7/6005* (2013.01); *H03M 7/6023* (2013.01); *H04B 10/2504* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/145* (2013.01); *H04L 41/147* (2013.01); *H04L 43/08* (2013.01); *H04L 43/0817* (2013.01); *H04L 43/0876* (2013.01); *H04L 43/0894* (2013.01); *H04L 43/16* (2013.01); *H04L 45/02* (2013.01); *H04L 45/52* (2013.01); *H04L 47/24* (2013.01); *H04L 47/38*

(2013.01); *H04L 47/765* (2013.01); *H04L 47/782* (2013.01); *H04L 47/805* (2013.01); *H04L 47/82* (2013.01); *H04L 47/823* (2013.01); *H04L 49/00* (2013.01); *H04L 49/15* (2013.01); *H04L 49/25* (2013.01); *H04L 49/357* (2013.01); *H04L 49/45* (2013.01); *H04L 49/555* (2013.01); *H04L 67/02* (2013.01); *H04L 67/10* (2013.01); *H04L 67/1004* (2013.01); *H04L 67/1008* (2013.01); *H04L 67/1012* (2013.01); *H04L 67/1014* (2013.01); *H04L 67/1029* (2013.01); *H04L 67/1034* (2013.01); *H04L 67/1097* (2013.01); *H04L 67/12* (2013.01); *H04L 67/16* (2013.01); *H04L 67/306* (2013.01); *H04L 67/34* (2013.01); *H04L 69/04* (2013.01); *H04L 69/329* (2013.01); *H04Q 1/04* (2013.01); *H04Q 11/00* (2013.01); *H04Q 11/0003* (2013.01); *H04Q 11/0062* (2013.01); *H04Q 11/0071* (2013.01); *H04W 4/023* (2013.01); *H05K 1/0203* (2013.01); *H05K 1/181* (2013.01); *H05K 5/0204* (2013.01); *H05K 7/1418* (2013.01); *H05K 7/1421* (2013.01); *H05K 7/1422* (2013.01); *H05K 7/1442* (2013.01); *H05K 7/1447* (2013.01); *H05K 7/1461* (2013.01); *H05K 7/1487* (2013.01); *H05K 7/1489* (2013.01); *H05K 7/1491* (2013.01); *H05K 7/1492* (2013.01); *H05K 7/1498* (2013.01); *H05K 7/2039* (2013.01); *H05K 7/20709* (2013.01); *H05K 7/20727* (2013.01); *H05K 7/20736* (2013.01); *H05K 7/20745* (2013.01); *H05K 7/20836* (2013.01); *H05K 13/0486* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/087* (2013.01); *G06Q 10/20* (2013.01); *G06Q 50/04* (2013.01); *G08C 2200/00* (2013.01); *H04B 10/25* (2013.01); *H04L 41/12* (2013.01); *H04L 41/5019* (2013.01); *H04L 43/065* (2013.01); *H04Q 2011/0037* (2013.01); *H04Q 2011/0041* (2013.01); *H04Q 2011/0052* (2013.01); *H04Q 2011/0073* (2013.01); *H04Q 2011/0079* (2013.01); *H04Q 2011/0086* (2013.01); *H04Q 2213/13523* (2013.01); *H04Q 2213/13527* (2013.01); *H04W 4/80* (2018.02); *H05K 7/1485* (2013.01); *H05K 2201/066* (2013.01); *H05K 2201/10121* (2013.01); *H05K 2201/10159* (2013.01); *H05K 2201/10189* (2013.01); *Y02D 10/14* (2018.01); *Y02D 10/151* (2018.01); *Y02P 90/30* (2015.11); *Y04S 10/54* (2013.01); *Y10S 901/01* (2013.01)

(56) References Cited

U.S. PATENT DOCUMENTS

| | | | | |
|---|---|---|---|---|
| 9,798,363 | B1* | 10/2017 | Ning | G06F 1/185 |
| 2005/0195629 | A1* | 9/2005 | Leddige | G11C 5/02 |
| | | | | 365/51 |
| 2007/0097642 | A1* | 5/2007 | Artman | G06F 1/20 |
| | | | | 361/700 |
| 2008/0259566 | A1* | 10/2008 | Fried | H05K 7/20809 |
| | | | | 361/699 |
| 2011/0110030 | A1 | 5/2011 | Fan et al. | |
| 2011/0304966 | A1* | 12/2011 | Schrempp | G06F 1/186 |
| | | | | 361/679.4 |
| 2014/0009884 | A1 | 1/2014 | Chen et al. | |
| 2016/0088775 | A1* | 3/2016 | Bailey | B21D 53/022 |
| | | | | 361/679.47 |

* cited by examiner

THERMALLY EFFICIENT COMPUTE RESOURCE APPARATUSES AND METHODS

RELATED CASE

This application claims priority to United States Provisional patent application entitled "Framework and Techniques for Pools of Configurable Computing Resources" filed on Nov. 29, 2016 and assigned Ser. No. 62/427,268; United States Provisional patent application entitled "Scalable System Framework Prime (SSFP) Omnibus Provisional II" filed on Aug. 18, 2016 and assigned Ser. No. 62/376,859; and United States Provisional patent application entitled "Framework and Techniques for Pools of Configurable Computing Resources" filed on Jul. 22, 2016 and assigned Ser. No. 62/365,969, each of which is hereby incorporated by reference in their entirety.

TECHNICAL FIELD

Embodiments described herein generally relate to data centers and particularly to heat sinks for physical devices within a data center.

BACKGROUND

Advancements in networking have enabled the rise in pools of configurable computing resources. A pool of configurable computing resources may be formed from a physical infrastructure including disaggregate physical resources, for example, as found in large data centers. The physical infrastructure can include a number of resources having processors, memory, storage, networking, power, cooling, etc. Management entities of these data centers can aggregate a selection of the resources to form servers and/or computing hosts. These hosts can subsequently be allocated to execute and/or host system SW (e.g., OSs, VMs, Containers, Applications, or the like). A number of challenges to conventional data centers exist. For example, managing the thermal energy generated by so many physical resources operating in enclosed spaces (e.g., server racks) and in close proximity to each other is a challenge.

DETAILED DESCRIPTION

Figure 1:
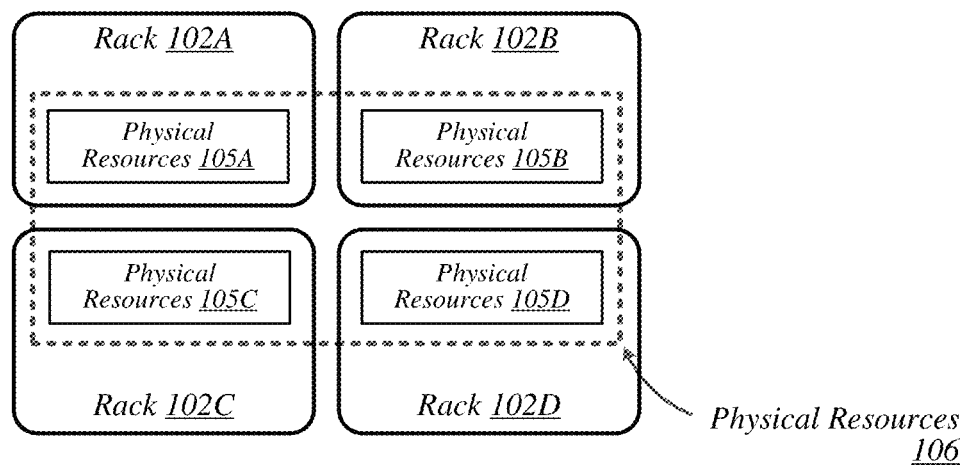
FIG. 1 illustrates a first example data center.

Data centers may generally be composed of a large number of racks that can contain numerous types of hardware or configurable resources (e.g., processing units, memory, storage, accelerators, networking, fans/cooling modules, power units, etc.). The types of hardware or configurable resources deployed in data centers may also be referred to as physical resources or disaggregate elements. It is to be appreciated, that the size and number of physical resources within a data center can be large, for example, on the order of hundreds of thousands of physical resources. These physical resources can be pooled to form virtual computing platforms for a large number and variety of computing tasks.

Furthermore, these physical resources are often arranged in racks located in a warehouse, or multiple warehouses. The present disclosure provides racks arranged to accept sleds and sleds arranged to house a number of physical resources. The racks and sleds described herein are arranged to provide efficient management of the thermal energy generated during operation of the physical resources. Said differently, the present disclosure provides racks, sleds, physical resources, and heat sinks for such physical resources configured and arranged to provide efficient dissipation of heat generated by operation of the physical resources.

For example, the present disclosure provides an open "bookcase" style rack arranged to accept sleds housing physical resources. However, unlike conventional server racks and server blades, the present disclosure sleds are "open" in that the physical resources are exposed to the exterior of the rack in which they are disposed. Additionally, fans are disposed along a back plane of the rack to generate a flow of air to dissipate thermal energy from the physical resources. Such fans, for example, can be "larger diameter" than conventional fans. In particular, such fans can have a diameter substantially equal to (or at least approximately equal to) a vertical height of the sleds.

The physical resources can be arranged on the sleds and heat sinks configured and coupled to the physical resources to prevent thermal shadowing between physical resources. The heat sinks can be arranged and have a size and configuration to provide for thermal dissipation of physical resources consuming 250 Watts or greater of power. These, and other features of the present disclosure will be described in greater detail below.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 illustrates a conceptual overview of a data center 100 that may generally be representative of a data center or other type of computing network in/for which one or more techniques described herein may be implemented according to various embodiments. As shown in this figure, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to the example of FIG. 1, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), graphics processing units (GPUs), memory, interconnect components, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity. Examples of such sleds, including illustrative arrangements of physical resources and heat sinks are given with respect to FIG. 12, FIG. 13, FIGS. 14A-14B, FIG. 15, FIG. 16, and FIG. 17. A more detailed description of these example sleds and feature of these sleds to facilitate dissipation of thermal energy is given below in conjunction with the description of these figures.

In the illustrative embodiment of FIG. 1, the data center 100 utilizes a single network architecture ("fabric") that supports multiple other network architectures including Ethernet, Omni-Path, a proprietary protocol, or the like. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A to 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in some embodiments, the racks 102A to 102D include integrated power sources that receive a greater current than is typical for power sources. The increased current enables the power sources to provide additional power to the components on each sled, enabling the components to operate at higher than typical frequencies.

It is to be appreciated, that operation at such higher than typical frequencies and/or consumption of greater than typical power can lead to increased thermal energy generation. However, as discussed herein, the present disclosure provides rack and sleds housing physical resources arranged to dissipate this increased thermal energy.

Figure 2:
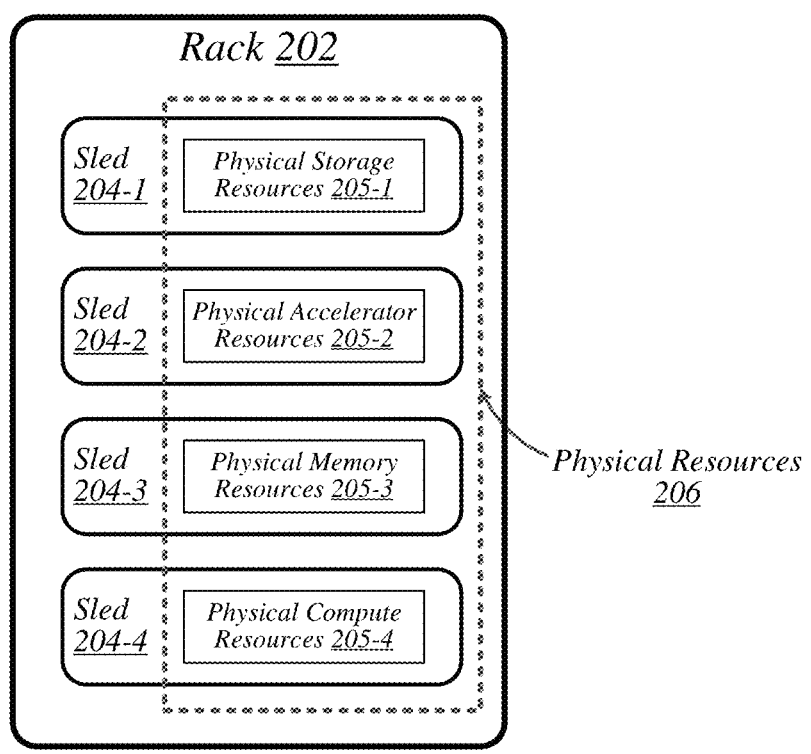
FIG. 2 illustrates a first example rack of a data center.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in this figure, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. Examples of such sleds, including illustrative arrangements of physical resources and heat sinks are given with respect to FIG. 12, FIG. 13, FIGS. 14A-14B, FIG. 15, FIG. 16, and FIG. 17. A more detailed description of these example sleds and feature of these sleds to facilitate dissipation of thermal energy is given below in conjunction with the description of these figures.

In the context depicted in the example of FIG. 2, physical resources 105A may thus be made up of the respective sets of physical resources 205-1 to 205-4 comprised in the sleds 204-1 to 204-4 of rack 202. As depicted in this illustrative embodiment, physical resources 205-1 to 205-4 include physical storage resources 205-1, physical accelerator resources 205-2, physical memory resources 205-3, and physical compute resources 205-4. The embodiments are not limited to this example. Each sled may contain a pool of any combination of the various types of physical resources (e.g., compute, memory, accelerator, storage). By having robotically accessible and robotically manipulable sleds comprising disaggregated resources, each type of resource can be upgraded independently of each other and at their own optimized refresh rate.

Figure 3:
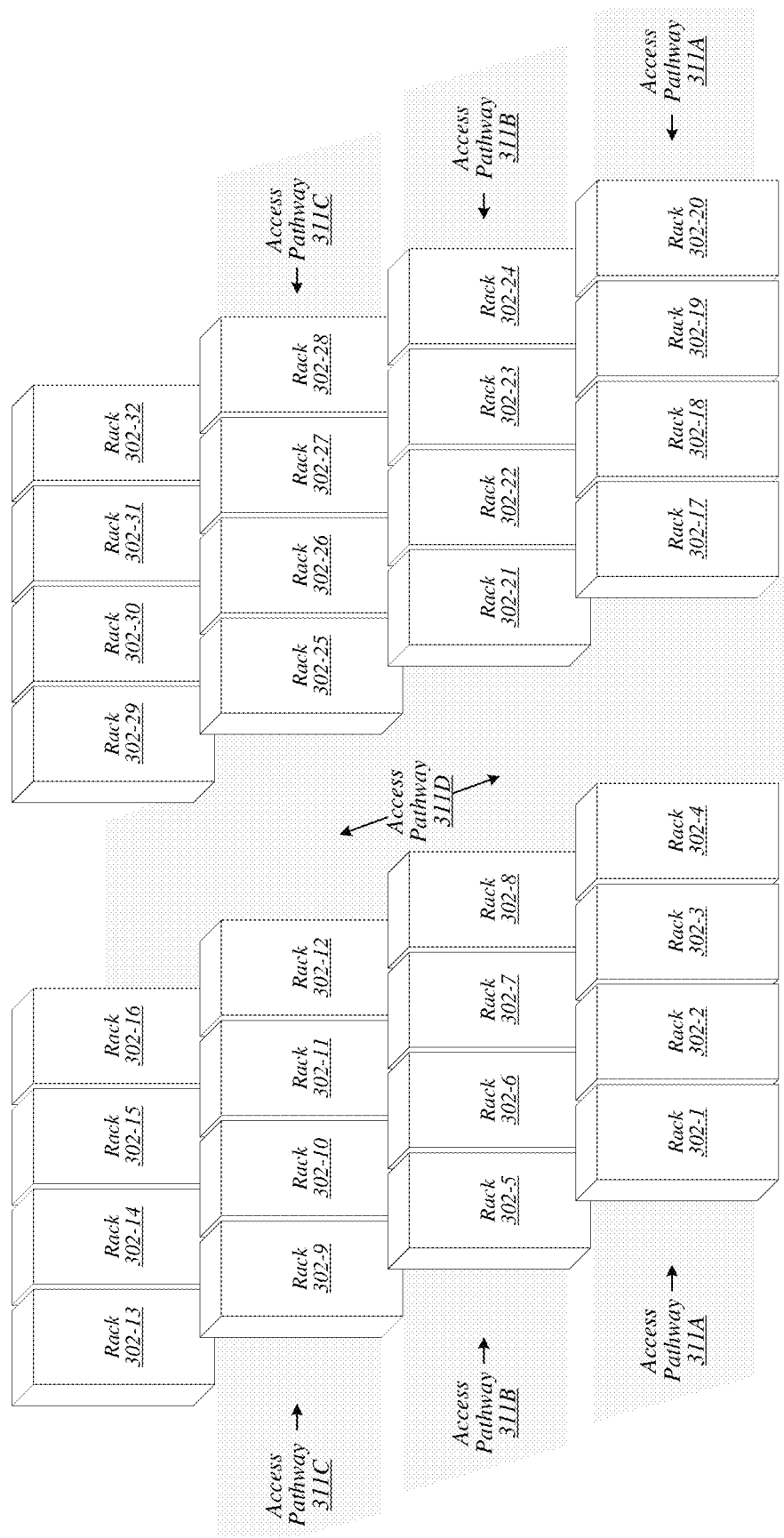
FIG. 3 illustrates a second example data center.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such a fashion as to define and/or accommodate various access pathways. For example, as shown in FIG. 3, the racks of data center 300 may be arranged in such a fashion as to define and/or accommodate access pathways 311A, 311B, 311C, and 311D. In some embodiments, the presence of such access pathways may generally enable automated maintenance equipment, such as robotic maintenance equipment to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
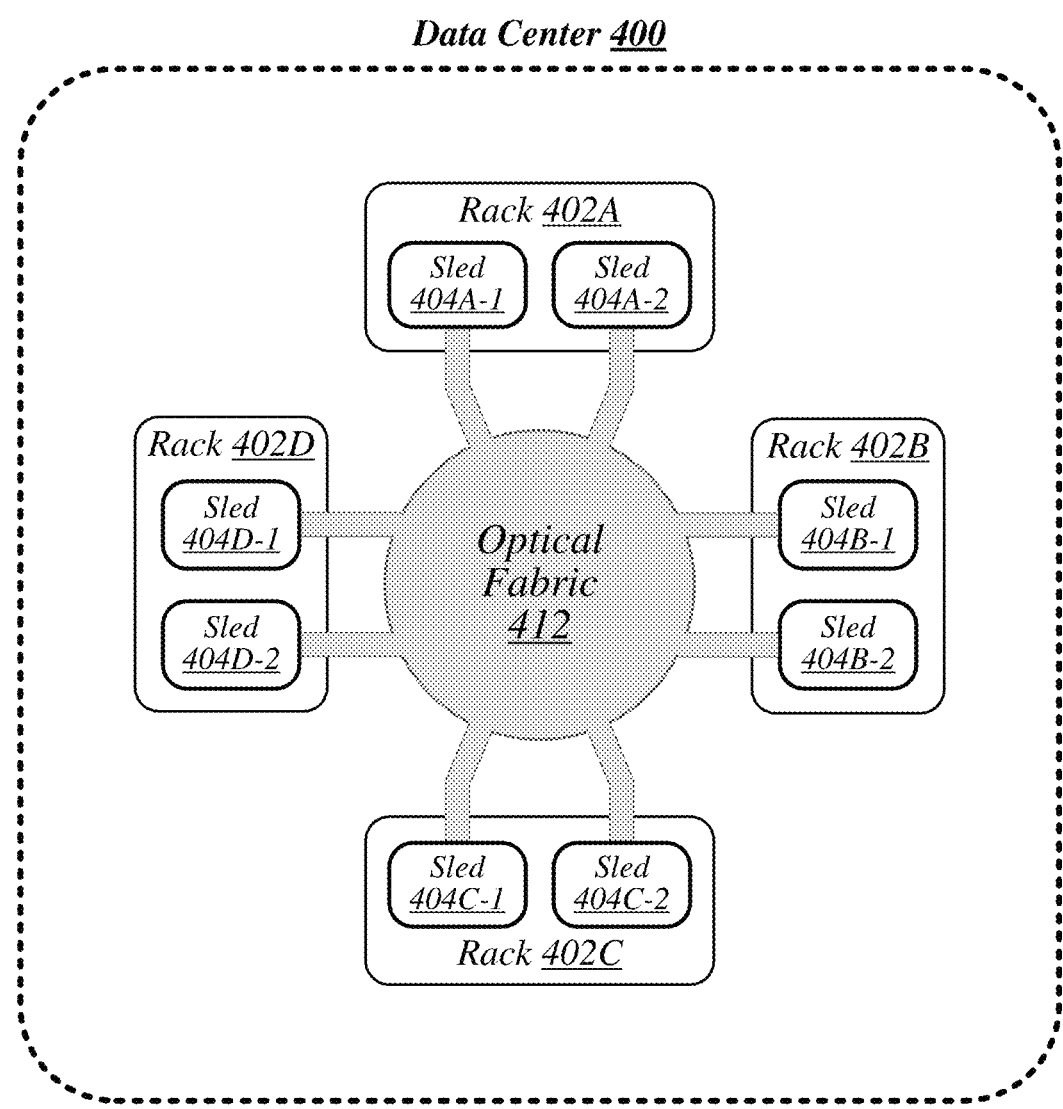
FIG. 4 illustrates a third example data center.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
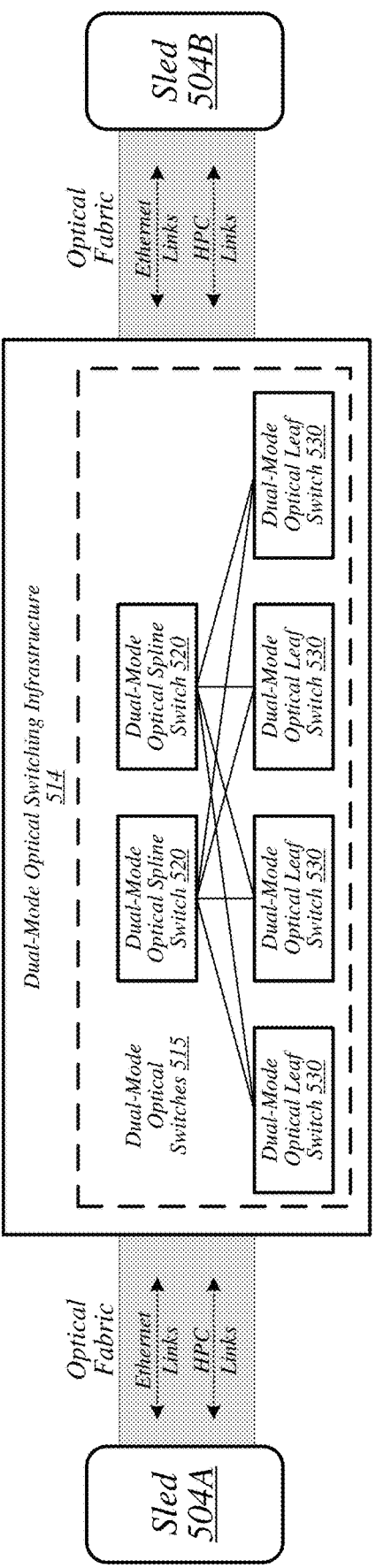
FIG. 5 illustrates a data center connectivity scheme.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
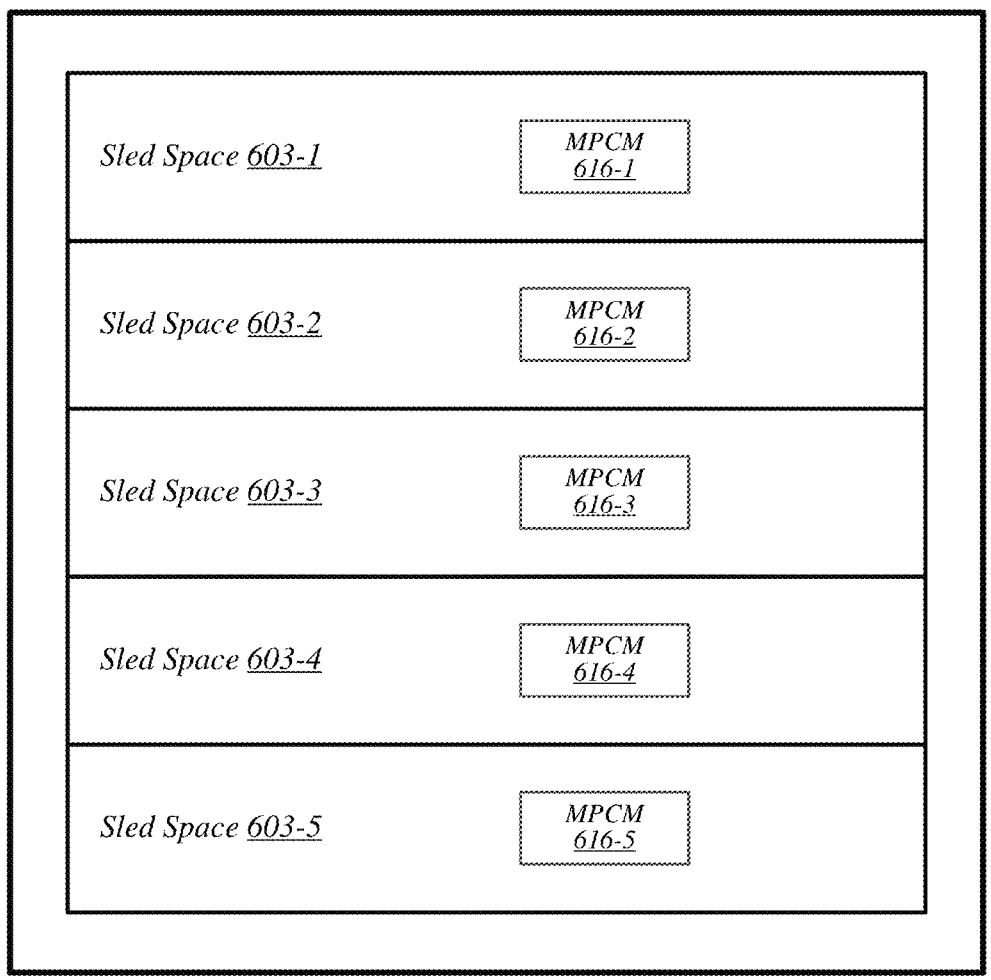
FIG. 6 illustrates a second example rack.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
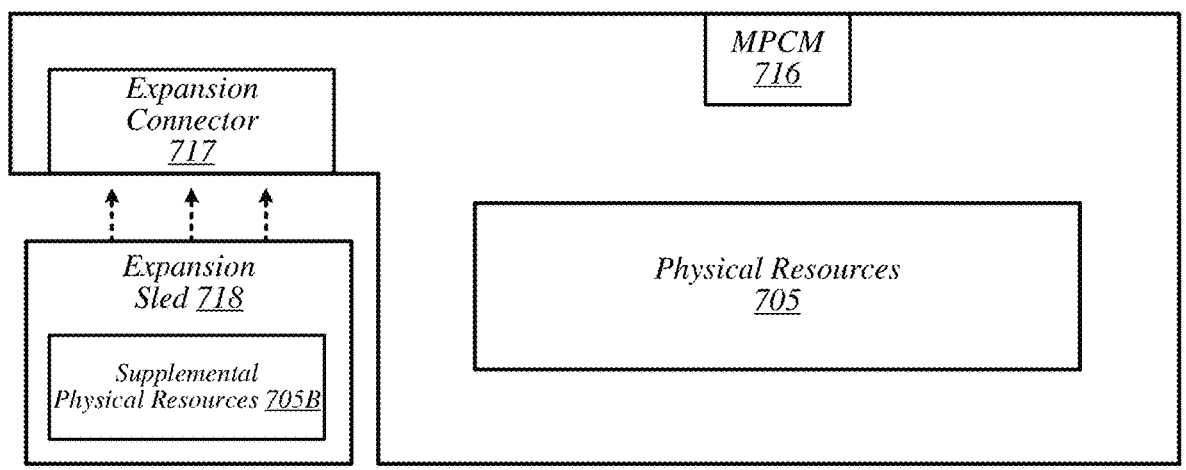
FIG. 7 illustrates a first example sled.

Included among the types of sleds to be accommodated by rack architecture 600 may be one or more types of sleds that feature expansion capabilities. FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
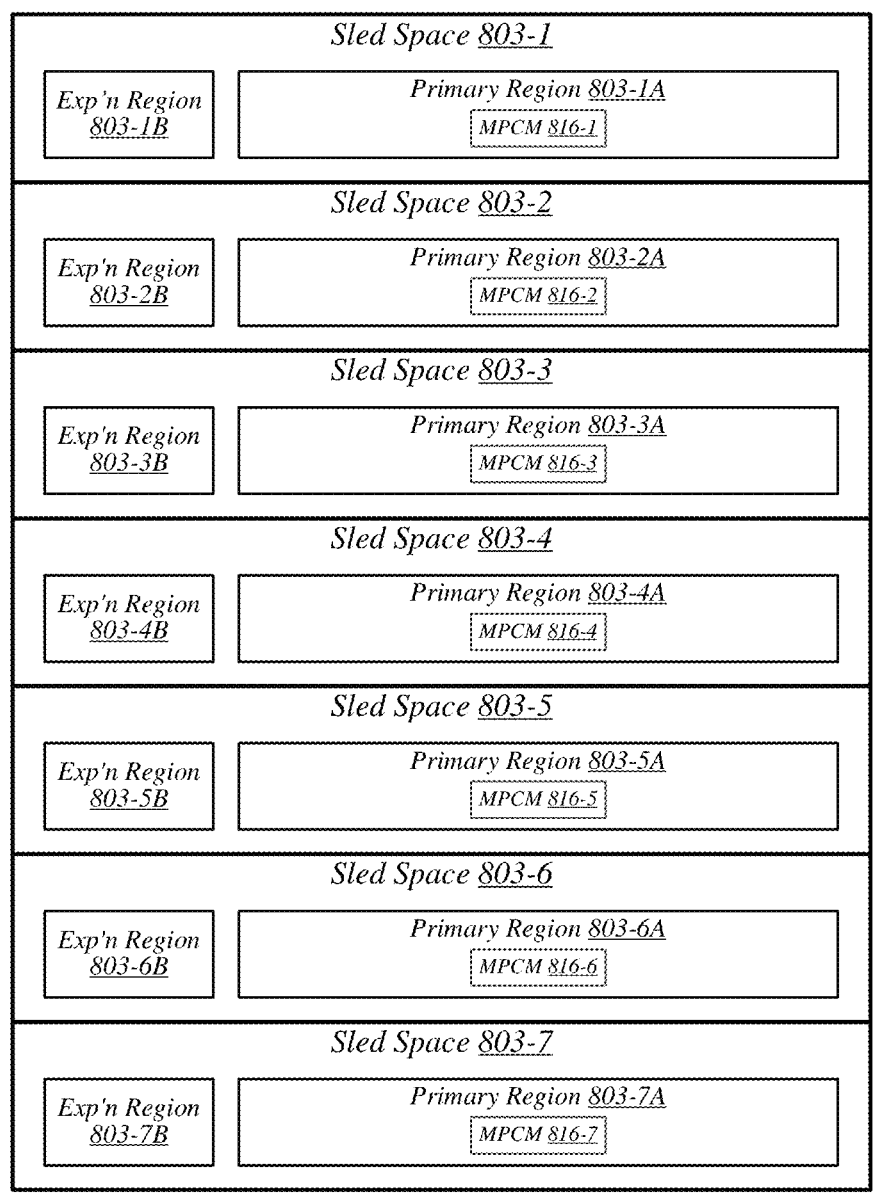
FIG. 8 illustrates a third example rack.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
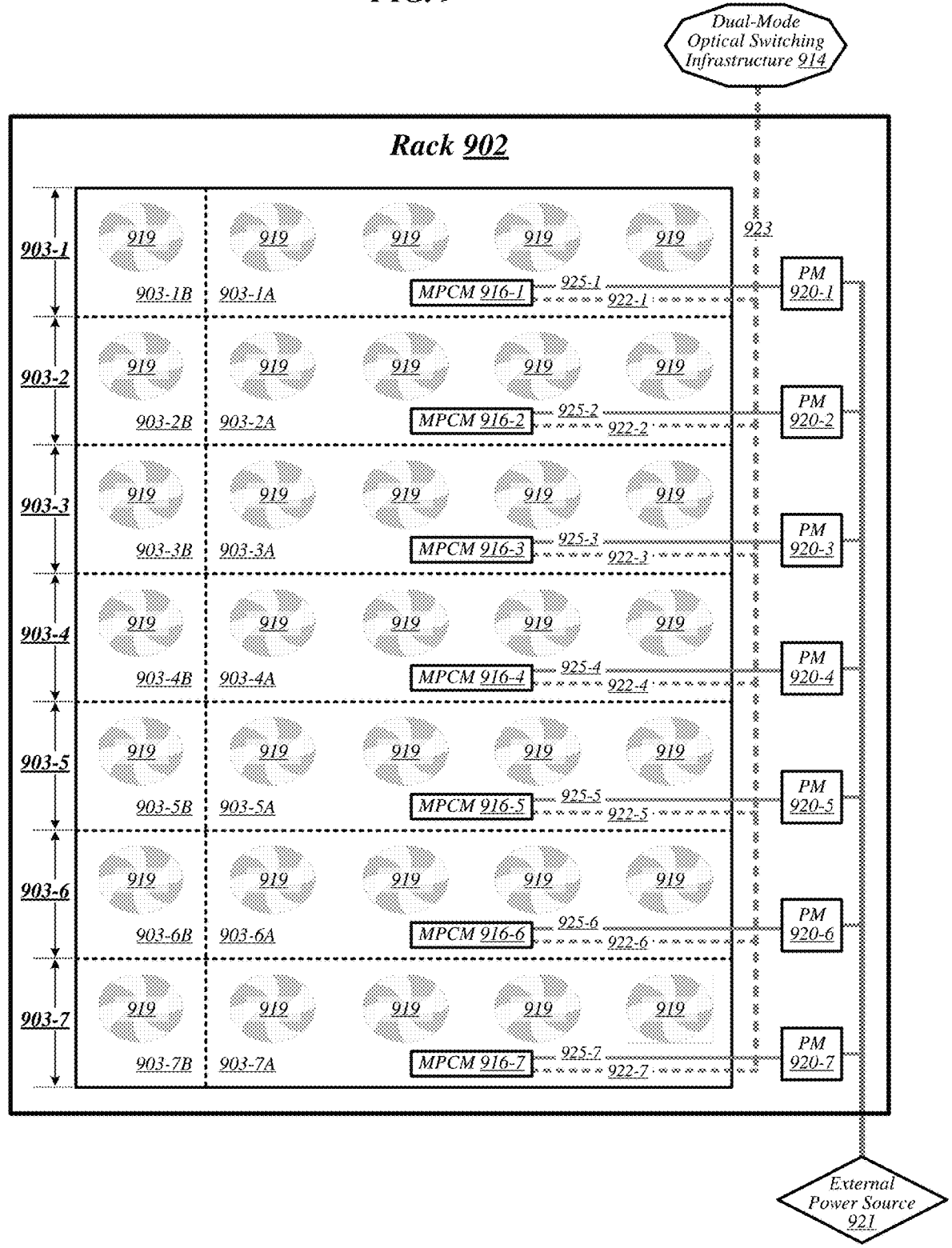
FIG. 9 illustrates a fourth example rack.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.). Furthermore, some sleds are arranged with physical resources disposed on an upper surface and lower surface of a centrally (to the sled) disposed substrate (e.g., refer to FIGS. 12-13, 14A-14B, 15, and 17). The centrally disposed substrate can, on such example sleds be positioned central to the fans 919 when inserted into a sled space 903. As such, the portion of the fan generating the least amount of airflow (e.g., the central axis of the fan) can be directed at the substrate while the fan blades (e.g., refer to FIG. 17) are directed at the physical resources disposed on the upper and lower surface of the sled. As such, an increase in dissipation of thermal energy can be provided versus conventional server blade. Thus, an increase in operating power consumption can be tolerated.

In this illustrative example of FIG. 9, MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. In some examples, MPCMs 916-1 to 916-7 can be coupled to respective power modules 920-1 to 920-7 via electrical power cabling 925-1 to 925-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect A data 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
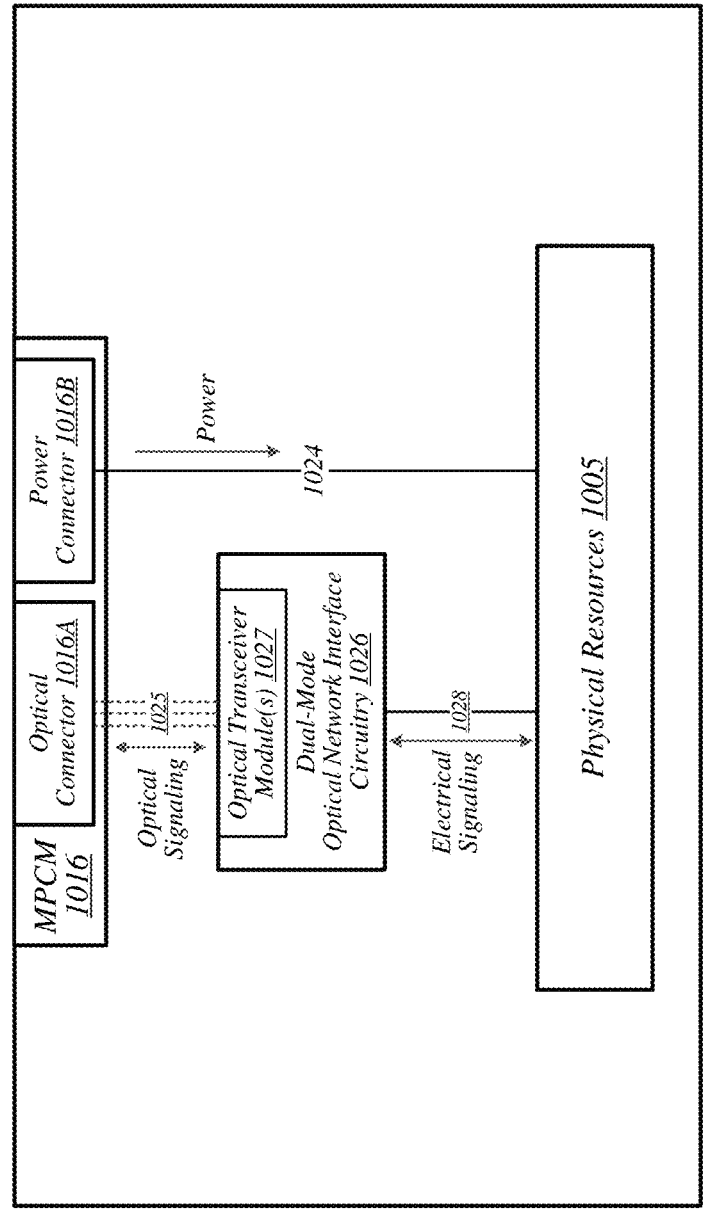
FIG. 10 illustrates a second example sled.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016B to couple with a power connector comprised in the counterpart MPCM. This may generally enable physical resources 1005 of sled 1004 to source power from an external source, via power connector 1016B and power transmission media 1024 that conductively couples power connector 1016B to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure (e.g., 514 of FIG. 5, 914 of FIG. 9, or the like). In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005 (e.g., refer to FIGS. 12-13, 14A-14B, 15, and 17). It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
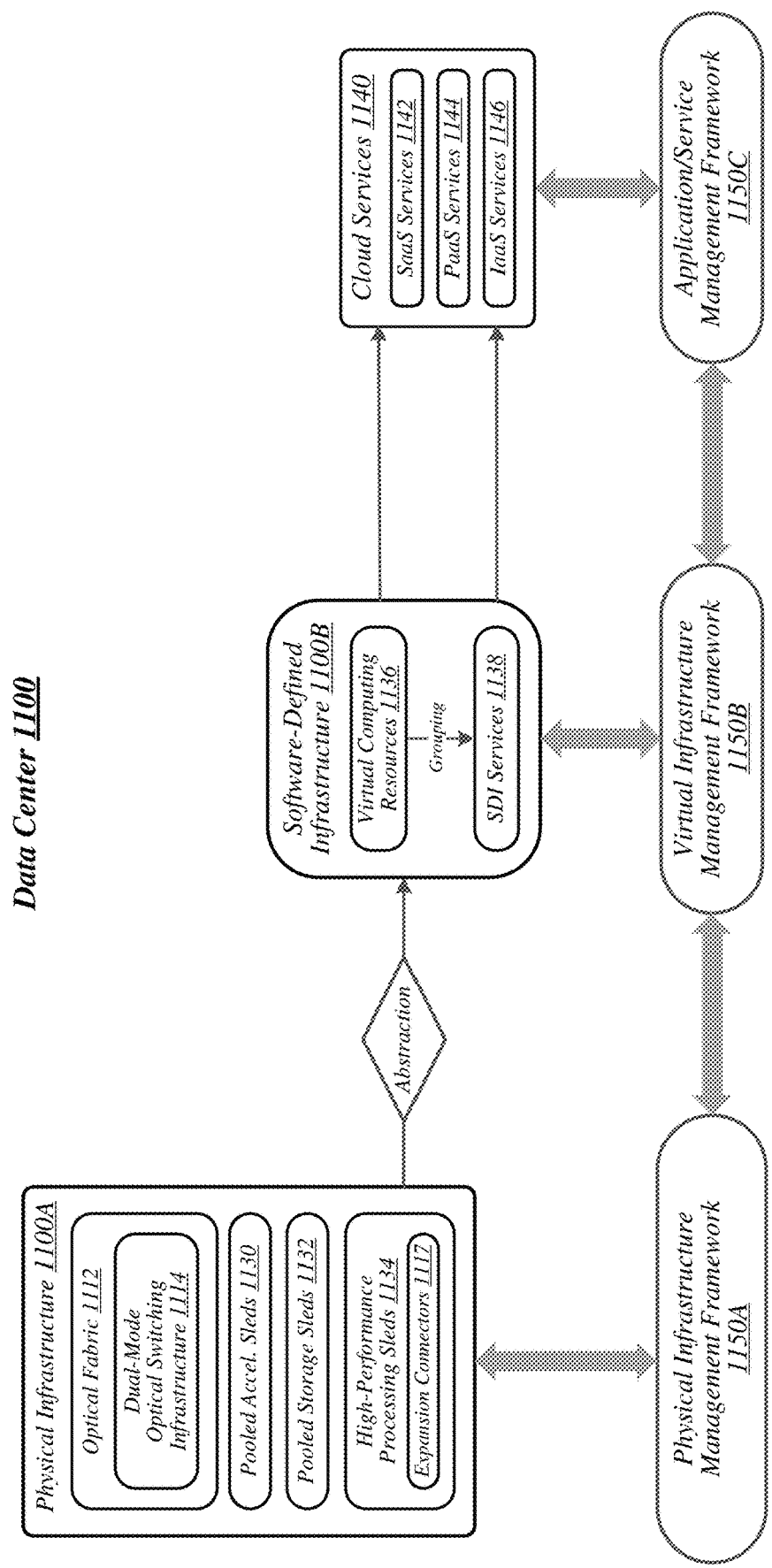
FIG. 11 illustrates a fourth example data center.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

As contemplated herein sleds can include any of a variety of physical resources (e.g., compute resources, memory resources, accelerator resources, storage resources, or the like). Furthermore, sleds can include physical resources arranged to couple a sled to a fabric (e.g., dual-mode optical network interface circuitry, or the like) as well as physical resources to control and/or manage other ones of the physical resources (e.g., voltage regulators, memory controllers, or the like). Each of these physical resources can generate thermal energy, or heat, during operation. The arrangement of the physical resources on the sleds and heat sinks coupled to the physical resources is provided to promote dissipation of the heat, thus allowing the physical resources to operate at greater than typical power consumption levels.

It is noted, that examples of every sled and every combination of physical resources are not provided herein. Instead, a number of illustrative examples of sled, and particularly, the arrangement of physical resources on the sleds and heat sinks coupled to the physical resources is provided. Such illustrative examples are given with respect to FIGS. 12-16. However, these examples are not to be limiting. In general, the depicted heat sinks can be comprised of any of a variety of materials having higher than typical thermal conductivity, such as, for example, aluminum and/or copper. In some examples, the heat sinks can comprise diamonds, or another composite material having thermal conductivity properties. For example, the heat sinks can comprise copper-tungsten pseudo-alloy, silicon carbide aluminum matrix alloys, diamond in copper-silver alloy, beryllium oxide alloys, or the like. Examples are not limited in this context.

Figure 12:
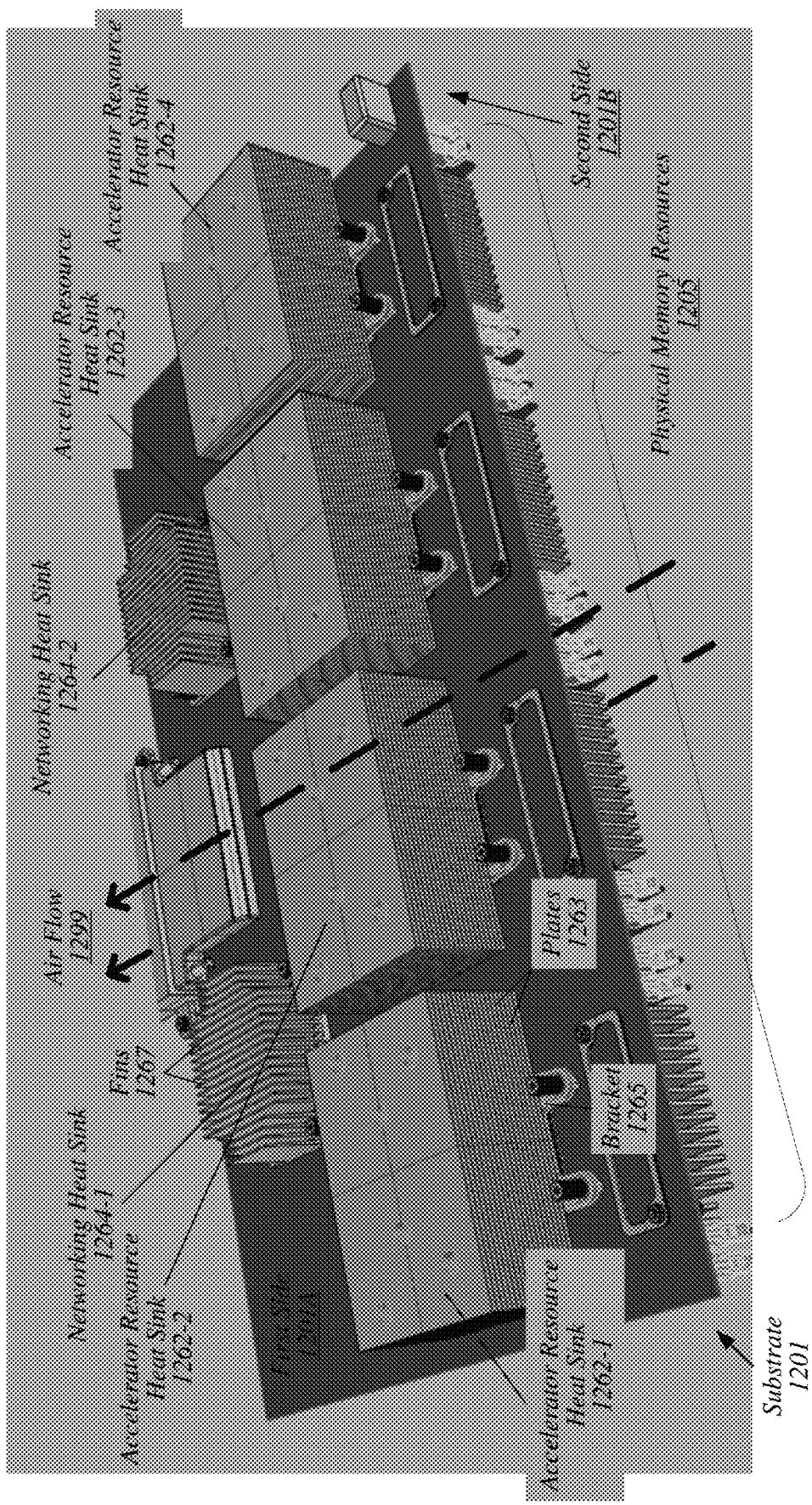
FIG. 12 illustrates a third example sled.

FIG. 12 illustrates a perspective views of a sled 1204 that may be representative of a sled implemented according to some embodiments. In this illustrative example, sled 1204 comprises physical accelerator resources. However, examples are not limited in this context. In the particular non-limiting example depicted in this figure, sled 1204 can include physical resources (some obscured by heat sinks) arranged on a substrate 1201. Furthermore, sled 1204 can include heat sinks coupled to a number of the physical resources. In the illustrative example of this figure, sled 1204 includes physical accelerator resources (obscured by heat sinks) and accelerator resource heat sinks 1262 coupled to the physical accelerator resources. Furthermore, sled 1204 includes at least physical memory resources 1205 as well as physical networking resources (obscured by heat sinks) and networking heat sinks 1264. In general, some of physical resources (e.g., accelerator resources) are disposed on a first side 1201A of the sled 1204 while other ones of physical resources (e.g., memory resources) are disposed on a second side 1201B of the sled, opposite from the first side of the sled.

In the illustrative example depicted in this figure, physical accelerator resources are coupled to the first side 1201A of substrate 1201 while the accelerator resource heat sinks 1262 are coupled to the first side 1201A of substrate 1201 and thermally coupled to the accelerator resources. In some examples, substrate 1201 can be a printed circuit board, a non-conductive material plate or frame upon which sled components are mounts, or the like. Networking resources (e.g., dual-mode optical network circuitry, or the like (obscured by heat sinks)) are coupled to the first side 1201A of substrate 1201 and network resource heat sinks 1264 are coupled to the first side 1201A of substrate 1201 and thermally coupled to the networking resources.

As contemplated herein, physical resources and thus heat sinks, are arranged to reduce or eliminate shadowing (i.e., one component in the air flow path of another component). Accordingly, as depicted, accelerator resources and accelerator heat sinks 1262 are located on a top side (e.g., first side 1201A) of sled 1204 while physical memory resources (e.g., embodied as memory DIMMs) are located on a bottom side (e.g., second side 1201B) of the sled 1204. As such, neither accelerator resources and associated heat sinks 1262 or memory DIMMs 1205 obscure the other from the path of airflow 1299. Airflow path 1299 is illustrated from front to back of sled 1204, for example, as may be provided by fans of a rack in which sled 1204 may be disposed (e.g., fans 919 of FIG. 9, or the like). It is important to note, however, that airflow 1299 could be from back to front (e.g., fans 919 can be arranged to pull air across sled 1204) or from front to back as depicted (e.g., fans 919 can be arranged to push air across sled 1204). Example are not limited in this context.

Accelerator resources and associated heat sinks 1262 are arranged on the first side 1201A of substrate 1201 in positions across a lateral plane of substrate 1201 so as to not thermally shadow each other. In particular, this illustrative example depicts four accelerator resources and associated heat sinks 1262-1, 1262-2, 1262-3, and 1262-4. Likewise, networking resources and associated heat sinks 1264-1 to 1264-4 are disposed laterally across substrate 1201 of sled 1204 so as not to obscure airflow 1299 from each other.

Heat sinks 1262-1 to 1262-4 can include a number of plates 1263 disposed in a horizontal plane (with respect to the substrate 1201) and stacked vertically from the accelerator resources. Plates 1263 can be thermally coupled to accelerator resources and arranged to dissipate heat generated by accelerator resources (e.g., refer to FIG. 15). Heat dissipation can be increased by airflow 1299. Plates 1263 can be coupled together via bracket 1265. Bracket 1265 can include a thermal coupling plate and posts (refer to FIGS. 14-15). Plates 1263 can be coupled to bracket 1265 (and particularly posts of bracket 1265) to fix plates 1263 in positions as depicted. As such, airflow 1299 can increase heat dissipation of heat sinks 1262-1 to 1262-4, and particularly, plates 1263 of heat sinks 1262-1 to 1262-4.

Networking heat sinks 1264-1 to 1264-2 can include fins 1267 arranged vertically (with respect to the substrate 1201). Fins 1267 can be thermally coupled to networking resources and arranged to dissipate heat generated by networking resources. Heat dissipation can be increased by airflow 1299.

It is noted, that networking resource and associated heat sinks 1264-1 and 1264-2 are arranged on substrate 1201 so as to limit thermally shadowing accelerator resources, and particularly, accelerator heat sinks 1262-1 to 1262-4. In particular, networking resource and heat sink 1264-1 is disposed on substrate 1201 between accelerator resources and heat sinks 1262-1 and 1262-2. Similarly, networking resource and heat sink 1264-2 is disposed on substrate 1201 between accelerator resources and heat sinks 1262-3 and 1262-4. The vertical arrangement of fins 1267 and the horizontal arrangement of plates 1263 are designed such shadowing of airflow 1299 by fins 1267 is limited. Thus, airflow 1299 can reach plates 1263 with limited obstruction by fins 1267. As a result, an increase in efficiency of heat dissipation versus conventional designs and sled arrangements can be realized. Additionally, DIMMs 1205 are arranged laterally so as not to block airflow 1299. As such, heat generated (e.g., during operation) by DIMMS 1205 can be dissipated by airflow 1299.

The enhanced airflow provided by the illustrative design of sled 1204, and particularly, the reduction of thermal shadowing and the arrangement of heat sinks 1262-1 to 1262-4 and 1264-1 and 1264-2 cooperate to provide increased thermal dissipation. As such, the sled 1204 can be configured to operate at higher than typical power while still maintaining acceptable thermal operation limits.

Figure 13:
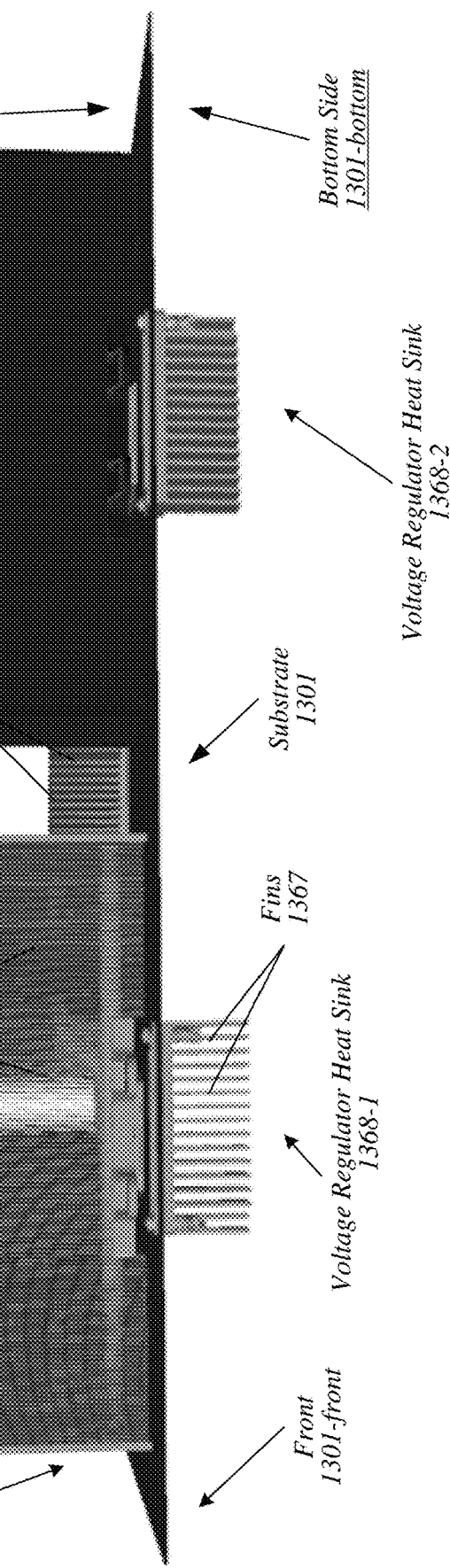
FIG. 13 illustrates a fourth example sled.

In some examples, heat sink plates 1263 can be arranged vertically (as opposed to horizontally as depicted in FIG. 12). Likewise, heat sink fins 1267 can be arranged horizontally (as opposed to vertically). FIG. 13 illustrates a perspective views of a sled 1304 that may be representative of a sled implemented according to some embodiments. In this illustrative example, sled 1304 comprises physical compute resources. However, examples are not limited in this context. In the particular non-limiting example depicted in this figure, sled 1304 can include physical resources (some obscured by heat sinks) arranged on a substrate 1301. Furthermore, sled 1304 can include heat sinks coupled to a number of the physical resources. In the illustrative example of this figure, sled 1304 includes physical compute resources (obscured by heat sinks) and compute resource heat sinks 1366 coupled to the physical compute resources. Furthermore, sled 1304 includes at least physical voltage regulator resources (obscured by heat sinks) and associated voltage regulator heat sinks 1368 as well as a physical networking resource (obscured by a heat sink) and a networking heat sink 1364. In general, some of physical resources (e.g., compute resources) are disposed on a top side 1301-top of the sled 1304 while other ones of physical resources (e.g., voltage regulator resources) are disposed on a bottom side 1301-bottom of the sled 1304.

Physical compute resources are coupled to the top side 1301-top of substrate 1301 while the compute resource heat sinks 1366 are coupled to the top side 1301-top of substrate 1301 and thermally coupled to the compute resources. Furthermore, networking resource (e.g., dual-mode optical network circuitry (obscured by heat sink)) is coupled to the top side 1301-top of substrate 1301 while the networking heat sinks 1364 is coupled to the top side 1301-top of substrate 1301 and thermally coupled to the networking resources.

Voltage regulator resources (e.g., configured to regulate voltage for compute resources, or the like) are coupled to the bottom side 1301-bottom of substrate 1301 while voltage regulator heat sinks 1368 are coupled to the bottom side 1301-bottom of substrate 1301 and thermally coupled to the voltage regulators.

As contemplated herein, physical resources and thus heat sinks, are arranged to reduce or eliminate shadowing (i.e., one component in the air flow path of another component). In the illustrative embodiment of this figure, compute resources and compute heat sinks 1366 are located on a top side of sled 1304 while voltage regulators are located on a bottom side of the sled 1304. As such, neither compute resources and associated heat sinks 1366 or voltage regulators and associated heat sinks 1368 obscure the other from the path of airflow (not depicted due to the perspective). Although airflow is not depicted in this figure, an airflow path can generally traverse from the back 1301-rear to the front 1301-front of sled 1304, for example as may be provided by fans of a rack in which sled 1304 may be disposed (e.g., fans 919 of FIG. 9, or the like). It is noted, that although airflow path is described with reference to a back to front movement, it could move front to back, or the like.

Compute resources and associated heat sinks 1366 are arranged on the upper side of sled 1304 substrate 1301 in positions across a lateral plane of substrate 1301 so as to not thermally shadow each other. In particular, this illustrative example depicts two compute resources and associated heat sinks 1366-1 and 1366-2. Heat sinks 1366-1 and 1366-2 can include a number of plates 1363 stacked vertically (with respect to the substrate 1301). Plates 1363 can be thermally coupled to compute resources and arranged to dissipate heat generated by compute resources. Heat dissipation can be increased by airflow across plates 1363. Plates 1363 can be coupled together by a heat sink shell 1369. Heat sink shell 1369 can increase a surface area of compute heat sinks 1366-1 and 1366-2 while providing a structure to attach and/or secure plates 1363 in the depicted arrangement.

Networking heat sink 1364 can include fins 1367 arranged vertically (with respect to the substrate 1201). Fins 1367 can be thermally coupled to networking resource and arranged to dissipate heat generated by networking resources. Heat dissipation can be increased by airflow across sled 1304.

It is noted, that networking resource and associated heat sink 1364 is arranged on substrate 1301 so as not to thermally shadow compute resources, and particularly, compute resource heat sinks 1362-1 and 1362-2. In particular, networking resource and heat sink 1364 is disposed on substrate 1301 between compute resources and heat sinks 1366-1 and 1366-2. The vertical arrangement of fins 1367 and the vertical arrangement of plates 1363 is designed such that airflow across (e.g., from front to back, back to front, or the like) is not obstructed by fins 1367 and/or plates 1363. Thus, airflow can reach plates 1363 unobstructed by fins 1367 and heat dissipation can remain unaffected.

Additionally, voltage regulator heat sinks 1368-1 and 1368-2 comprises fins 1367 arranged vertically (with respect to the substrate 1201). Fins 1367 can be thermally coupled to voltage regulator resources and arranged to dissipate heat generated by voltage regulator resources. Heat dissipation can be increased by airflow across sled 1304. It is noted, that fins 1367 can be arranged horizontally with respect to substrate 1301 without departing from the spirit and scope of the disclosure. Examples are not limited in this context.

The enhanced airflow provided by the illustrative design of sled 1304, and particularly, the lack of thermal shadowing and the arrangement of heat sinks 1364, 1366-1 to 1366-2 and 1368-1 to 1368-2 cooperate to provide increased thermal dissipation. As such, the sled 1204 can be configured to operate at higher than typical power while still maintaining acceptable thermal operation limits.

Figure 14:
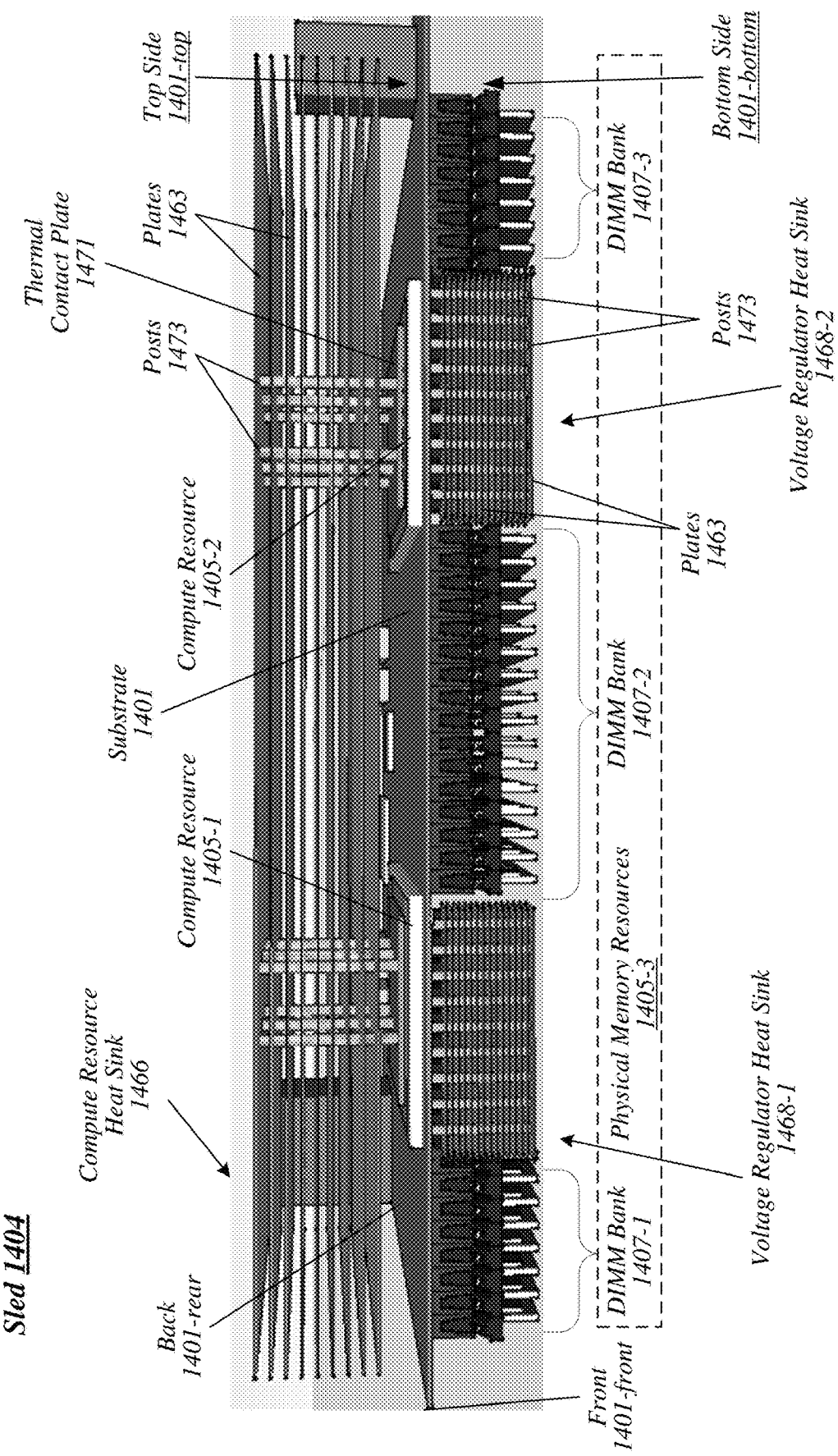
FIG. 14 illustrates a fifth example sled.

FIG. 14 illustrates a perspective views of a sled 1404 that may be representative of a sled implemented according to some embodiments. In this illustrative example, sled 1404 comprises physical compute resources. However, examples are not limited in this context. In the particular non-limiting example depicted in this figure, sled 1404 can include physical resources (some obscured by heat sinks) arranged on a substrate 1401. Furthermore, sled 1404 can include heat sinks coupled to a number of the physical resources. In the illustrative example of this figure, sled 1404 includes physical compute resources 1405-1 and 1405-2 and a combined compute resource heat sink 1466 coupled to both physical compute resources 1405-1 and 1405-2. Sled 1404 additionally, includes physical memory resources 1405-3 as well as physical voltage regulator resources (obscured by heat sinks) and associated voltage regulator heat sinks 1468. In general, some of physical resources (e.g., compute resources) are disposed on a top side 1401-top of the sled 1404 while other ones of physical resources (e.g., voltage regulator resources and memory resources) are disposed on a bottom side 1401-bottom of the sled 1404.

Physical compute resources 1405-1 to 1405-2 are coupled to top side 1401-top of substrate 1401 (e.g., via CPU sockets, or the like) while the combined compute resource heat sink 1466 is coupled to the top side 1401-top of substrate 1401 and thermally coupled to both the compute resources 1405-1 and 1405-2.

Voltage regulator resources (e.g., configured to regulate voltage for compute resources 1405-1 and/or 1405-2, or the like) are coupled to the bottom side 1401-bottom of substrate 1401 while voltage regulator heat sinks 1468 are coupled to the bottom side 1401-bottom of substrate 1401 and thermally coupled to the voltage regulators. Likewise, physical memory resources 1405-3 are coupled to the bottom side 1401-bottom of substrate 1401. In particular, physical memory resources are depicted embodied as memory DIMMs coupled to sockets disposed on substrate 1401.

As contemplated herein, physical resources and thus heat sinks, are arranged to reduce or eliminate shadowing (i.e., one component in the air flow path of another component). In the illustrative embodiment of this figure, compute resources 1405-1 and 1405-2 and combined compute heat sink 1466 are located on a top side of sled 1404 while voltage regulators are located on a bottom side of the sled 1404. As such, neither compute resources and associated heat sink 1466 or voltage regulators and associated heat sinks 1468 obscure the other from the path of airflow (not depicted due to the perspective). Although airflow is not depicted in this figure, airflow path can generally traverse from the back 1401-rear to the front 1401-front of sled 1404, for example as may be provided by fans of a rack in which sled 1404 may be disposed (e.g., fans 919 of FIG. 9, or the like).

Memory resources 1405-3 are depicted split into multiple DIMM banks 1407. For example, DIMM banks 1407-1, 1407-2 and 1407-3 are depicted. DIMMs within each DIMM bank 14071 to 1407-3 are disposed laterally along bottom 1401-bottom of substrate 1401 so as not to block airflow. Furthermore, voltage regulator resources are associated heat sinks 1468 are disposed between DIMM banks 1407. In particular, a first voltage regulator and heat sink 1468-1 is depicted disposed between DIMM banks 1407-1 and 1407-2 while a second voltage regulator and heat sink 1468-2 is depicted disposed between DIMM banks 1407-2 and 1407-3. As such, neither physical memory resources 1405-3 or voltage regulators and associated heat sinks 1468-1 to 1468-2 thermally shadow each other, despite being disposed on the same side (e.g., bottom 1401-bottom) of substrate 1401.

Combined heat sink 1466 can include a number of plates 1463, thermal contact plates 1471 and posts 1473. In particular, heat sink 1466 can include a thermal contact plate 1471 for each of the compute resources 1405 to which the heat sink 1466 is coupled. Thermal contact plates 1471 can be shaped and/or include features to thermally contact with heat generating components, such as, physical compute resources 1405-1 and 1405-2. Plates 1463 are disposed in a horizontal plane (with respect to the substrate 1401) and stacked vertically from substrate 1401. Plates 1463 are thermally coupled to compute resources 1405-1 to 1405-2 via posts 1473 and thermal contact plates 1471 as depicted in this illustrative example. Accordingly, plates 1473 can be configured to dissipate heat generated by physical compute resources 1405-1 and 1405-2. Heat dissipation can be increased by airflow across plates 1463.

Heat sinks 1468-1 to 1468-2 can include a number of plates 1463 disposed in a horizontal plane (with respect to the substrate 1401) and stacked vertically from the voltage regulator resources. Plates 1463 can be thermally coupled to voltage regulator resources and arranged to dissipate heat generated by voltage regulator resources. Heat dissipation can be increased by airflow across sled 1404. Plates 1463 can be coupled together via posts 1473 and a thermal contact plate (obscured by this perspective).

The enhanced airflow provided by the illustrative design of sled 1404, and particularly, the lack of thermal shadowing and the arrangement of heat sinks 1466 and 1468-1 to 1468-2 cooperate to provide increased thermal dissipation. As such, the sled 1404 can be configured to operate at higher than typical power while still maintaining acceptable thermal operation limits.

Figure 15:
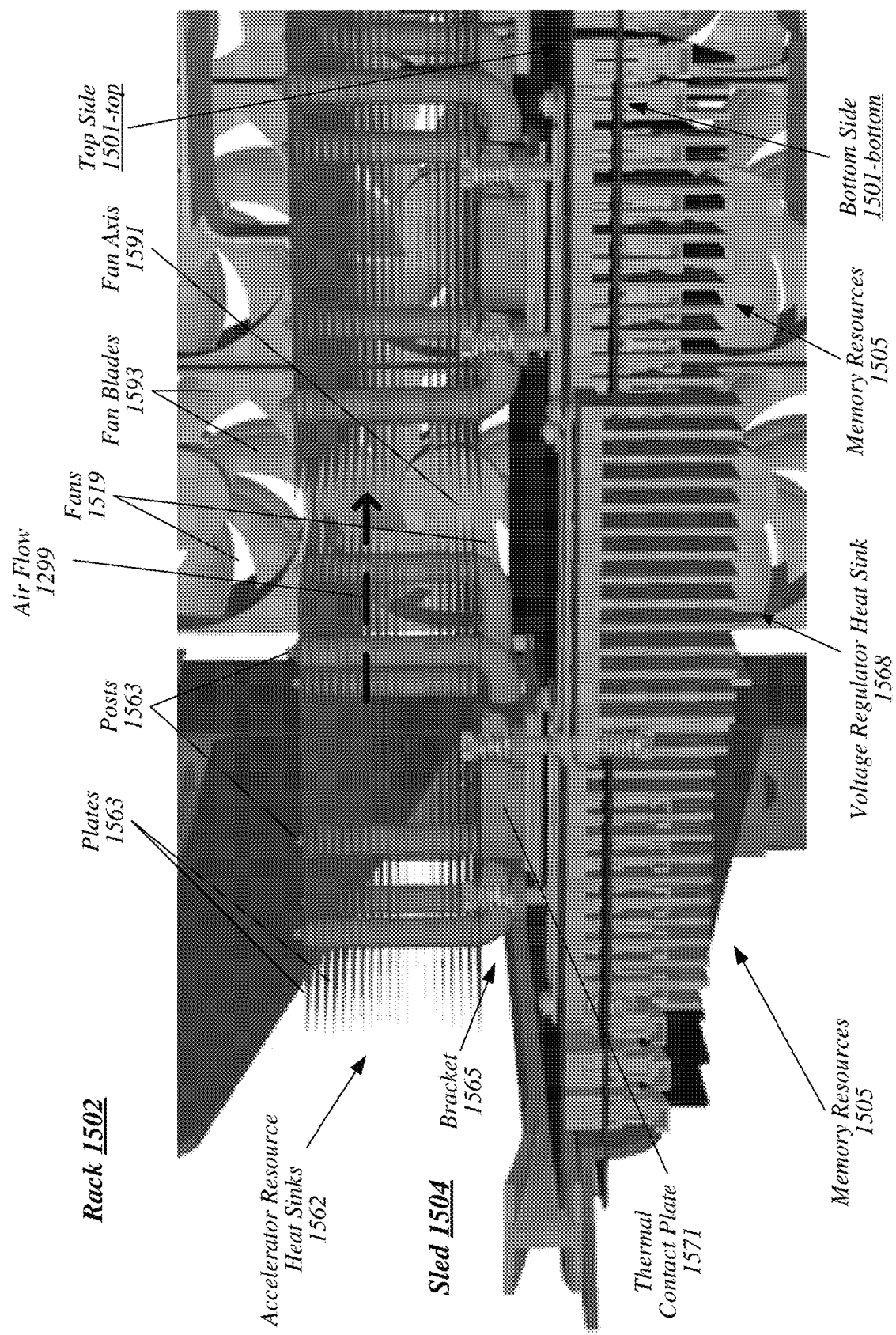
FIG. 15 illustrates a portion of a sixth example sled disposed in a rack.

FIG. 15 illustrates a perspective views of a portion of a sled 1505 disposed in a rack 1502 that may be representative of a sled and rack implemented according to some embodiments. It is noted, that many features of the sled 1504 and rack 1502 are not specifically, called out for purposes of clarity. However, it is noted, that the sled 1504 features a central substrate 1501 with physical resources disposed on both a top 1501-top and bottom 1501-bottom of substrate 1501. For example, sled 1504 comprises accelerator resources and associated heat sinks 1562 disposed on top 1501-top of substrate 1501. In particular, heat sinks 1562 can comprise a bracket having a thermal contact plate 1571 and posts 1563. Heat sinks 1562 can also comprise plates 1563 attached to posts 1563. Furthermore, sled 1504 comprises memory resources 1505 (e.g., memory DIMMs, or the like) and voltage regulators and associated heat sinks 1568 disposed on a bottom 1501-bottom of substrate 1501. A more detailed description of example arrangements of resources on sled 1504 is given with respect to FIGS. 12 to 14 above. The components of sled 1504 and their position on sled 1504 is depicted here for purposes of illustration only.

Rack 1502 includes at least fans 1519 (e.g., like fans 919 of FIG. 9, or the like) disposed along a back plane of rack 1502. It is noted, that sled 1504 is disposed within a sled space (e.g., sled space 903 of FIG. 9, or the like) of rack 1502. Due to the position of sled 1504 within the sled space of rack 1502, fans 1519 provide airflow 1599 from a top portion of fans 1519 to cool physical resources and associated heat sinks disposed on a top 1501-top of sled 1504 while fans 1519 also provide airflow (not depicted due to the perspective) from a bottom portion of fans 1519 to cool physical resources and associated heat sinks disposed on a bottom 1501-bottom of sled 1504.

Said differently, sled 1504 is disposed in a sled space of rack 1502 such that substrate 1501 is positioned in a same (or substantially the same) plane as a central axis 1591 of fans 1519 corresponding to the sled space of rack 1502 in which sled 1504 is disposed. Thus, during rotation of the fan 1519, fan blades 1593 can provide airflow 1599 which is directed both above and below substrate 1501.

Figure 16:
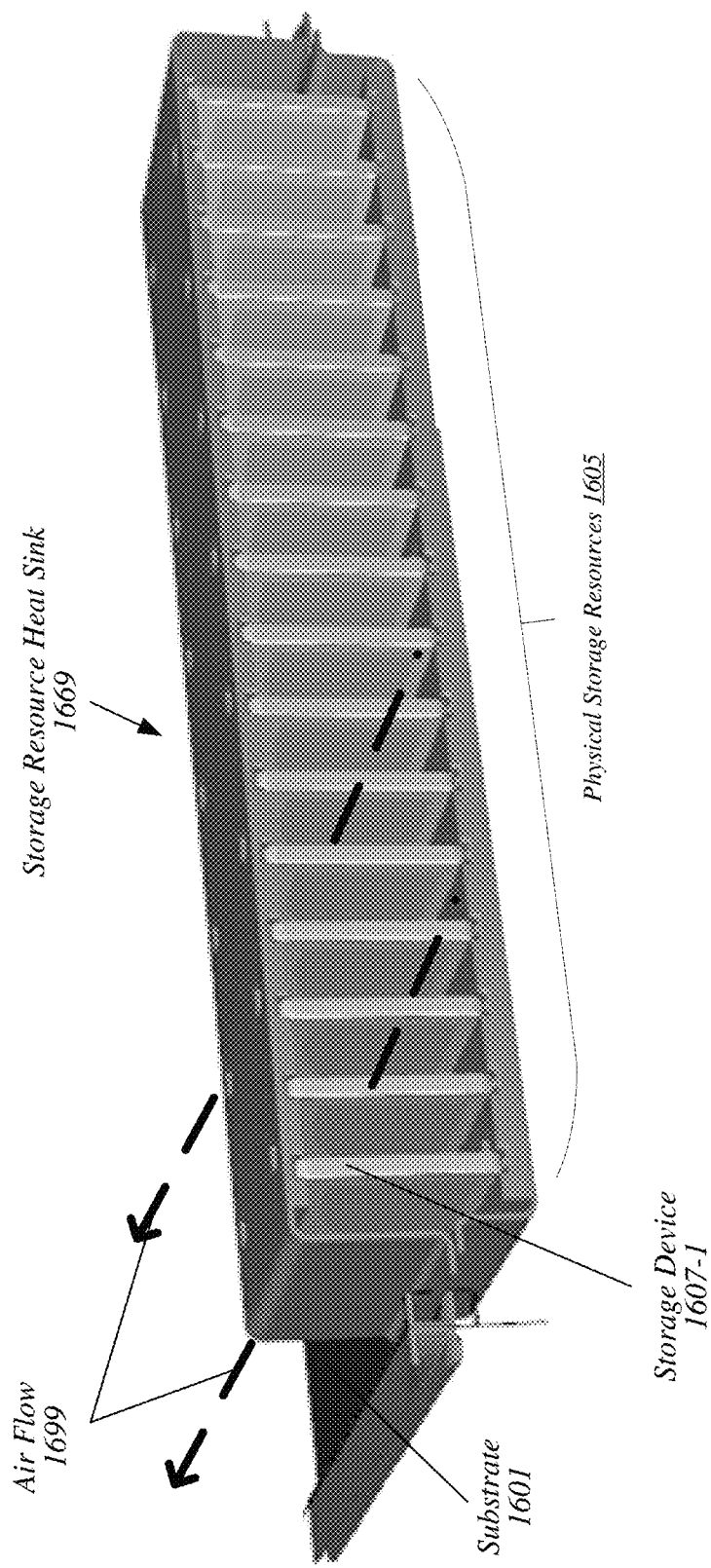
FIG. 16 illustrates a seventh example sled.

FIG. 16 illustrates a perspective view of a sled 1604 that may be representative of a sled implemented according to some embodiments. In this illustrative example, sled 1604 comprises physical storage resources 1605. However, examples are not limited in this context. In the particular non-limiting example depicted in this figure, sled 1604 can include physical resources arranged on a substrate 1601. Physical storage resources 1605 can include a number of storage devices 1607 (e.g., 1607-1 identified in this figure). The storage devices can be solid-state drives (SSDs) as depicted, or other storage devices (e.g., non-volatile memory DIMMs, or the like). Sled 1604 can further comprise a storage resource heat sink 1669.

Storage resource heat sink 1669 can be configured to retain storage devices 1607 (in some examples, removably retain) in a vertical position with respect to substrate 1601. Thus, as depicted, individual storage devices 1607 of physical storage resources are laterally disposed along substrate 1601 so as not to thermally shadow each other. Said differently, each of storage devices 1607 does not substantially obscure other ones of the storage devices 1607 from airflow 1699. In some examples, storage resource heat sink 1669 can comprise material having thermally conductive properties to provide increased thermal cooling of physical storage resources during operation.

In some examples, storage resource heat sink 1669 can comprise a non-thermally conductive material and operate to position individual storage resources 1605 in an airflow path where each storage resources 1605 limits thermal shadowing of other storage resources as depicted. Examples are not limited in this context.

Figure 17:
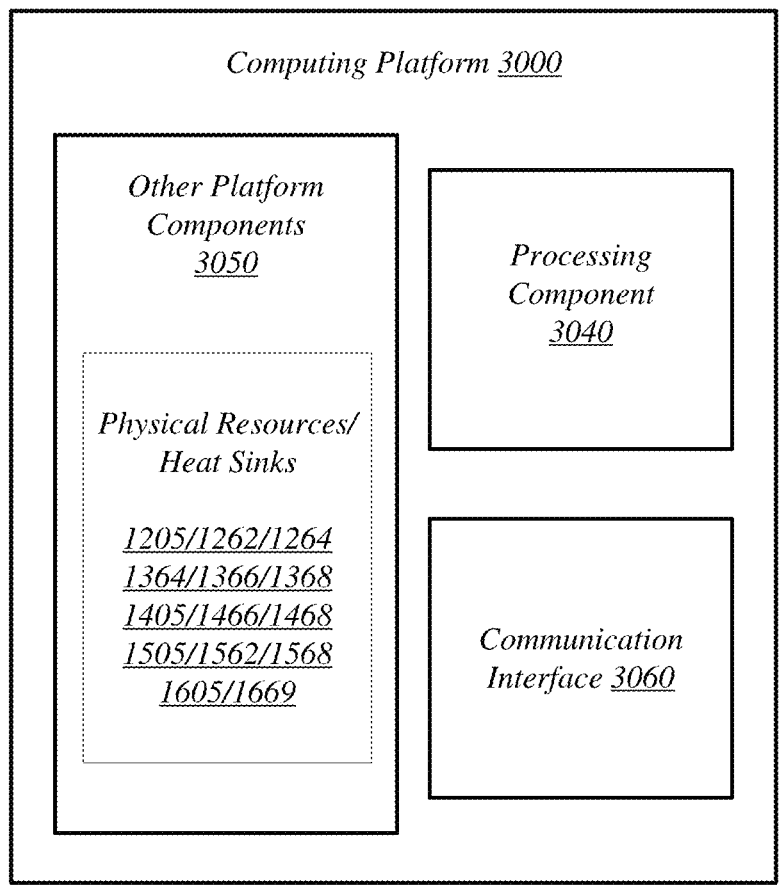
FIG. 17 illustrates an example computing platform.

FIG. 17 illustrates an example computing platform 3000. In some examples, as shown in this figure, computing platform 3000 may include any of a processing component 3040, other platform components 3050 or a communications interface 3060. According to some examples, computing platform 3000 may host physical storage resources for a data center, such as, the data centers depicted herein. Computing platform 3000 may either be a single physical server or a composed logical server that includes combinations of physical resources from a pool of configurable physical resources.

According to some examples, processing component 3040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 3050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, other platform components 3050 can include physical resources 1205, physical resources 1405, physical resources 1505, and/or physical resources 1605. Furthermore, in some examples, other platform components 3050 can include heat sinks 1262, heat sinks 1264, heat sinks 1364, heat sinks 1366, heat sinks 1368, heat sinks 1466, heat sinks 1468, heat sinks 1562, heat sinks 1568, and/or heat sinks 1669.

In some examples, communications interface 3060 may include logic and/or features to support a communication interface. For these examples, communications interface 3060 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification. Network communications may also occur according to the Infiniband Architecture specification or the TCP/IP protocol.

The components and features of computing platform 3000 may be implemented using any combination of discrete circuitry, application specific integrated circuits (ASICs), logic gates and/or single chip architectures. Further, the features of computing platform 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 3000 shown in the block diagram this figure may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present disclosure can be implemented in any of a variety of embodiments, such as, for example, the following non-exhaustive listing of example embodiments.

Example 1

A data center sled, comprising: a substrate having a top surface and a bottom surface; a first plurality of physical resources disposed on the top surface of the substrate; and at least one heat sink coupled to the top surface of the substrate and thermally coupled to the first plurality of physical resources, the first plurality of physical resources arranged on the top surface laterally across the top surface of the substrate to reduce thermal shadowing between ones of the first plurality of physical resources.

Example 2

The data center sled of example 1, wherein the substrate is a printed circuit board.

Example 3

The data center sled of example 1, wherein the at least one heat sink is greater than 1U server height, greater than 2U server height, greater than 3U server height, or greater than 4U server height.

Example 4

The data center sled of example 1, the first plurality of physical resources arranged in a row disposed laterally across the top surface.

Example 5

The data center sled of example 1, comprising a second plurality of physical resources disposed on the bottom surface of the substrate, the second plurality of physical resources arranged on the bottom surface laterally across the bottom surface to reduce thermal shadowing between ones of the second plurality of physical resources.

Example 6

The data center sled of example 5, the second plurality of physical resources comprising a plurality of memory modules.

Example 7

The data center sled of example 6, the plurality of memory modules comprising dual in-line memory modules (DIMMs), each of the plurality DIMMs arranged on the bottom surface of the substrate such that ends of each of the DIMMs are positioned perpendicular to a front edge of the top surface of the substrate.

Example 8

The data center sled of example 7, the second plurality of physical resources comprising a voltage regulator resource, the voltage regulator resource disposed on the bottom surface of the substrate between a first subset of the plurality of DIMMs and a second subset of the plurality of DIMMs, the first subset of the plurality of DIMMs comprising different DIMMs from the second subset of the plurality of DIMMs.

Example 9

The data center sled of example 1, the first plurality of resources comprising a first compute resource and a second compute resource, the at least one heat sink comprising: a pair of thermal contact plates, a first one of the pair of thermal contact plates thermally coupled to the first compute resource and a second one of the pair of thermal contact plates thermally coupled to the second compute resource; at least one first post and at least one second post, the at least one first post mechanically and thermally coupled to the first one of the pair of thermal contact plates and the at least one second post mechanically and thermally coupled to the second one of the pair of thermal contact plates; and a plurality of plates, the plurality of plates disposed in a plane horizontal to the substrate and fixed in a stack extending vertically from the pair of thermal contact plates via the at least one first post and the at least one second posts.

Example 10

The data center sled of example 1, the first plurality of resources comprising a first compute resource and a second compute resource, the at least one heat sink comprising, for each of the first compute resource and the second compute resource, a compute heat sink, the compute heat sink comprising: a plurality of plates thermally coupled to a one of the plurality of resources, the plurality of plates disposed in a plane perpendicular to the substrate; and a heat sink shell mechanically coupled to the plurality of plates to fix the plurality of plates in a lateral stack across a portion of the substrate.

Example 11

The data center sled of example 10, wherein the heat sink shell is thermally coupled to the plurality of plates.

Example 12

The data center sled of example 1, the first plurality of resources comprising a first resource and a second resource, the at least one heat sink comprising, for each of the first resource and the second resource, a heat sink, the heat sink comprising: a thermal contact plate thermally coupled to a one of the plurality of resources; at least one post mechanically and thermally coupled to the thermal contact plate; and a plurality of plates, the plurality of plates disposed in a plane horizontal to the substrate and fixed in a stack extending vertically from the thermal contact plate via the at least one post.

Example 13

The data center sled of example 12, the first resource and second resource comprising physical accelerator resources or physical compute resources.

Example 14

The data center sled of example 12, the first plurality of resources comprising at least one networking resource, the at least one heat sink comprising a networking resource heat sink, the networking resource heat sink comprising a plurality of fins disposed in a plane perpendicular to upper surface of the substrate and a front edge of the substrate.

Example 15

The data center sled of example 14, the at least one networking resource disposed between the first resource and the second resource laterally across the data center sled.

Example 16

A heat sink for a plurality of physical resources of data center sled, the heat sink comprising: a thermal contact plate for each one of a plurality of physical resources, each of the thermal contact plates to thermally coupled to the one of the plurality of physical resources; at least one post for each one of the plurality of thermal contact plates, the at least one post mechanically and thermally coupled to the one of the plurality of thermal contact plates; and a plurality of plates, each of the plurality of plates disposed in a parallel planes and fixed in a stack via the at least one posts of each of the plurality of thermal contact plates.

Example 17

The heat sink of example 16, wherein the heat sink is greater than 1U server height, greater than 2U server height, greater than 3U server height, or greater than 4U server height.

Example 18

The heat sink of example 16, the plurality of thermal contact plates comprising aluminum, copper, an aluminum alloy, or a copper alloy.

Example 19

The heat sink of example 18, the plurality of plates comprising aluminum, copper, an aluminum alloy, or a copper alloy.

Example 20

The heat sink of example 19, the plurality of physical resources comprising physical compute resources.

Example 21

A heat sink for a physical compute resource of a data center sled, the heat sink comprising: a plurality of plates to thermally couple to a physical resource disposed in a first plane, the plurality of plates disposed in a second plane perpendicular to a substrate; and a heat sink shell mechanically coupled to the plurality of plates to fix the plurality of plates in a lateral stack across the second plane.

Example 22

The heat sink of example 21, wherein the heat sink is greater than 1U server height, greater than 2U server height, greater than 3U server height, or greater than 4U server height.

Example 23

The heat sink of example 21, the physical resource disposed on a substrate of a sled for a data center, the first plane parallel to the substrate surface.

Example 24

The heat sink of example 23, the plurality of plates comprising a length between 60% and 85% of the width of the substrate and disposed laterally across the substrate to reduce thermal shadowing of the heat sink.

Example 25

The heat sink of example 24, wherein the heat sink shell is thermally coupled to the plurality of plates.

Example 26

The heat sink of example 24, the plurality of plates comprising aluminum, copper, an aluminum alloy, or a copper alloy.

Example 27

The heat sink of example 24, the physical resource comprising a physical compute resources or a physical accelerator resource.

Example 28

A heat sink for a physical compute resource of a data center sled, the heat sink comprising: a thermal contact plate to thermally couple to a physical resource disposed in a first plane; at least one post mechanically and thermally coupled to the thermal contact plate; and a plurality of plates, the plurality of plates disposed in a second plane horizontal to the first plane and fixed in a stack extending vertically from the thermal contact plate via the at least one post.

Example 29

The heat sink of example 28, wherein the heat sink is greater than 1U server height, greater than 2U server height, greater than 3U server height, or greater than 4U server height.

Example 30

The heat sink of example 28, the physical resource disposed on a substrate of a sled for a data center, the first plane parallel to the substrate surface.

Example 31

The heat sink of example 30, the plurality of plates comprising a length between 60% and 85% of the width of the substrate and disposed laterally across the substrate to reduce thermal shadowing of the heat sink.

Example 32

The heat sink of example 31, the physical resource comprising physical accelerator resources or physical compute resources.

Example 33

The heat sink of example 31, the thermal contact plate comprising aluminum, copper, an aluminum alloy, or a copper alloy.

Example 34

The heat sink of example 31, the plurality of plates comprising aluminum, copper, an aluminum alloy, or a copper alloy.

Example 35

A system for a data center comprising: a rack comprising at least one fan to provide an airflow; a sled to couple to the rack in a position to receive the airflow, the sled comprising: a substrate having a top surface and a bottom surface; a first plurality of physical resources disposed on the top surface of the substrate; and at least one heat sink coupled to the top surface of the substrate and thermally coupled to the first plurality of physical resources, the first plurality of physical resources arranged on the top surface laterally across the top surface of the substrate to reduce thermal shadowing of the airflow between ones of the first plurality of physical resources, the sled disposed in the rack.

Example 36

The system of example 35, wherein the substrate is a printed circuit board.

Example 37

The system of example 35, wherein the at least one heat sink is greater than 1U server height, greater than 2U server height, greater than 3U server height, or greater than 4U server height.

Example 38

The system of example 35, comprising a second plurality of physical resources disposed on the bottom surface of the substrate, the second plurality of physical resources arranged on the bottom surface laterally across the bottom surface to reduce thermal shadowing of the airflow between ones of the second plurality of physical resources.

Example 39

The system of example 38, the second plurality of physical resources comprising a plurality of memory modules.

Example 40

The system of example 39, the plurality of memory modules comprising dual in-line memory modules (DIMMs), each of the plurality DIMMs arranged on the bottom surface of the substrate such that ends of each of the DIMMs are positioned perpendicular to a front edge of the top surface of the substrate.

Example 41

The system of example 40, the second plurality of physical resources comprising a voltage regulator resource, the voltage regulator resource disposed on the bottom surface of the substrate between a first subset of the plurality of DIMMs and a second subset of the plurality of DIMMs, the first subset of the plurality of DIMMs comprising different DIMMs from the second subset of the plurality of DIMMs.

Example 42

The system of example 35, the first plurality of resources comprising a first compute resource and a second compute resource, the at least one heat sink comprising: a pair of thermal contact plates, a first one of the pair of thermal contact plates thermally coupled to the first compute resource and a second one of the pair of thermal contact plates thermally coupled to the second compute resource; at least one first post and at least one second post, the at least one first post mechanically and thermally coupled to the first one of the pair of thermal contact plates and the at least one second post mechanically and thermally coupled to the second one of the pair of thermal contact plates; and a plurality of plates, the plurality of plates disposed in a plane horizontal to the substrate and fixed in a stack extending vertically from the pair of thermal contact plates via the at least one first post and the at least one second posts.

Example 43

The system of example 35, the first plurality of resources comprising a first compute resource and a second compute resource, the at least one heat sink comprising, for each of the first compute resource and the second compute resource, a compute heat sink, the compute heat sink comprising: a plurality of plates thermally coupled to a one of the plurality of resources, the plurality of plates disposed in a plane perpendicular to the substrate; and a heat sink shell mechanically coupled to the plurality of plates to fix the plurality of plates in a lateral stack across a portion of the substrate.

Example 44

The system of example 43, wherein the heat sink shell is thermally coupled to the plurality of plates.

Example 45

The system of example 35, the first plurality of resources comprising a first resource and a second resource, the at least one heat sink comprising, for each of the first resource and the second resource, a heat sink, the heat sink comprising: a thermal contact plate thermally coupled to a one of the plurality of resources; at least one post mechanically and thermally coupled to the thermal contact plate; and a plurality of plates, the plurality of plates disposed in a plane horizontal to the substrate and fixed in a stack extending vertically from the thermal contact plate via the at least one post.

Example 46

A method to reduce thermal shadowing of heat sinks of a sled of a data center, the method comprising: providing an airflow across a substrate of a sled; arranging a first plurality of physical resources on a top surface of the substrate, the first plurality of physical resources arranged in a row perpendicular to the airflow; and thermally coupling at least one heat sink to the first plurality of physical resources.

Example 47

The method of example 46, wherein the substrate is a printed circuit board.

Example 48

The method of example 46, wherein the at least one heat sink is greater than 1U server height, greater than 2U server height, greater than 3U server height, or greater than 4U server height.

Example 49

The method of example 46, comprising: arranging a second plurality of physical resources on the bottom surface of the substrate, the second plurality of physical resources arranged in a row perpendicular to the airflow.

Example 50

The method of example 49, the second plurality of physical resources comprising a plurality of memory modules.

Example 51

The method of example 50, the plurality of memory modules comprising dual in-line memory modules (DIMMs), each of the plurality DIMMs arranged on the bottom surface of the substrate such that ends of each of the DIMMs are positioned perpendicular to a front edge of the top surface of the substrate.

Example 52

The method of example 49, the first plurality of physical resources comprising physical accelerator resources or physical compute resources.

Example 53

The method of example 52, comprising, for each one of the first plurality of physical resources, thermally coupling a heat sink to the first plurality of physical resources, the plurality of heat sinks disposed in a row perpendicular to the airflow.

Example 54

The method of example 53, comprising: arranging a physical networking resource on the top surface of the substrate, the physical networking resource arranged between ones of the first plurality of physical resources; and thermally coupling a networking resource heatsink to the physical networking resource, the networking resource heat sink disposed between the plurality of heat sinks.

The invention claimed is:
1. A data center sled, comprising:
a substrate having a top surface and a bottom surface;
a first plurality of physical resources disposed on the top surface of the substrate; and
at least one heat sink coupled to the top surface of the substrate and thermally coupled to the first plurality of physical resources, the first plurality of physical resources arranged on the top surface laterally across the top surface of the substrate between a first lateral edge and a second lateral edge of the top surface of the substrate to reduce thermal shadowing between ones of the first plurality of physical resources, wherein no two physical resources of the first plurality of physical resources thermally shadow each other along a direction parallel to the first and second lateral edges and that extends from a front edge of the top surface of the substrate to a back edge of the top surface of the substrate; and a connector mounted to the top surface of the substrate toward the back edge and behind the first plurality of physical resources relative to the front edge, wherein the connector is to mate with a corresponding connector of a rack while the data center sled is mounted in the rack.

2. The data center sled of claim 1, wherein the substrate is a printed circuit board and the at least one heat sink is greater than 1U height.

3. The data center sled of claim 1, comprising a second plurality of physical resources disposed on the bottom surface of the substrate, the second plurality of physical resources arranged on the bottom surface laterally across the bottom surface to reduce thermal shadowing between ones of the second plurality of physical resources.

4. The data center sled of claim 3, the second plurality of physical resources comprising a plurality of memory modules, the plurality of memory modules comprising dual in-line memory modules (DIMMs), each of the plurality DIMMs arranged on the bottom surface of the substrate such that ends of each of the DIMMs are positioned perpendicular to a front edge of the top surface of the substrate.

5. The data center sled of claim 4, the second plurality of physical resources comprising a voltage regulator resource, the voltage regulator resource disposed on the bottom surface of the substrate between a first subset of the plurality of DIMMs and a second subset of the plurality of DIMMs, the first subset of the plurality of DIMMs comprising different DIMMs from the second subset of the plurality of DIMMs.

6. The data center sled of claim 1, the first plurality of physical resources comprising a first compute resource and a second compute resource, the at least one heat sink comprising:
a pair of thermal contact plates, a first one of the pair of thermal contact plates thermally coupled to the first compute resource and a second one of the pair of thermal contact plates thermally coupled to the second compute resource;
at least one first post and at least one second post, the at least one first post mechanically and thermally coupled to the first one of the pair of thermal contact plates and the at least one second post mechanically and thermally coupled to the second one of the pair of thermal contact plates; and
a plurality of plates, the plurality of plates disposed in a plane horizontal to the substrate and fixed in a stack extending vertically from the pair of thermal contact plates via the at least one first post and the at least one second posts.

7. The data center sled of claim 1, the first plurality of physical resources comprising a first compute resource and a second compute resource, the at least one heat sink comprising, for each of the first compute resource and the second compute resource, a compute heat sink, the compute heat sink comprising:
a plurality of plates thermally coupled to a one of the plurality of resources, the plurality of plates disposed in a plane perpendicular to the substrate; and
a heat sink shell mechanically coupled to the plurality of plates to fix the plurality of plates in a lateral stack across a portion of the substrate.

8. The data center sled of claim 7, wherein the heat sink shell is thermally coupled to the plurality of plates.

9. The data center sled of claim 1, the first plurality of physical resources comprising a first resource and a second resource, the at least one heat sink comprising, for each of the first resource and the second resource, a heat sink, the heat sink comprising:
a thermal contact plate thermally coupled to a one of the plurality of resources;
at least one post mechanically and thermally coupled to the thermal contact plate; and
a plurality of plates, the plurality of plates disposed in a plane horizontal to the substrate and fixed in a stack extending vertically from the thermal contact plate via the at least one post.

10. The data center sled of claim 9, the first resource and second resource comprising physical accelerator resources or physical compute resources.

11. The data center sled of claim 9, the first plurality of physical resources comprising at least one networking resource, the at least one heat sink comprising a networking resource heat sink, the networking resource heat sink comprising a plurality of fins disposed in a plane perpendicular to upper surface of the substrate and a front edge of the substrate.

12. The data center sled of claim 11, the at least one networking resource disposed between the first resource and the second resource laterally across the data center sled.

* * * * *